United States Patent
Ogasawara et al.

(10) Patent No.: US 8,235,160 B2
(45) Date of Patent: Aug. 7, 2012

(54) POWER UNIT FOR SMALL TYPE VEHICLE WITH VALVE OPERATION CONTROLLER AND SPEED CHANGE CONTROLLER DISPOSED ON OPPOSITE SIDE OF CLUTCH DEVICE

(75) Inventors: Atsushi Ogasawara, Saitama (JP); Hayato Maehara, Saitama (JP); Toshiyuki Sato, Saitama (JP); Yasushi Fujimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 306 days.

(21) Appl. No.: 12/239,297

(22) Filed: Sep. 26, 2008

(65) Prior Publication Data
US 2009/0170658 A1   Jul. 2, 2009

(30) Foreign Application Priority Data
Dec. 28, 2007   (JP) ................ 2007-341201

(51) Int. Cl.
*F16H 61/688*   (2006.01)
*F16H 61/32*   (2006.01)
*B60K 5/04*   (2006.01)

(52) U.S. Cl. ........ 180/291; 180/230; 180/376; 192/48.9

(58) Field of Classification Search .......... 180/219, 180/291, 376, 230; 192/48.611–48.614, 192/48.9, 48.91, 87.15; 74/330
See application file for complete search history.

(56) References Cited

U.S. PATENT DOCUMENTS

| | | | |
|---|---|---|---|
| 4,556,025 A * | 12/1985 | Morita | 123/198 F |
| 4,841,182 A * | 6/1989 | Tsuchiya et al. | 310/68 D |
| 7,089,906 B2 * | 8/2006 | Tsukui et al. | 123/198 F |
| 7,131,933 B2 * | 11/2006 | Tabata | 477/181 |
| 2005/0211007 A1 * | 9/2005 | Suzuki et al. | 74/340 |
| 2006/0011006 A1 * | 1/2006 | Suzuki et al. | 74/473.1 |
| 2006/0094567 A1 * | 5/2006 | Kosugi et al. | 477/129 |
| 2006/0219034 A1 * | 10/2006 | Hori et al. | 74/330 |
| 2007/0074593 A1 * | 4/2007 | Mizuno et al. | 74/330 |
| 2007/0074594 A1 * | 4/2007 | Mizuno et al. | 74/337.5 |
| 2007/0199392 A1 * | 8/2007 | Mizuno et al. | 74/325 |
| 2008/0099266 A1 * | 5/2008 | Hiroi et al. | 180/219 |

FOREIGN PATENT DOCUMENTS

JP    2003-232236 A    8/2003

* cited by examiner

*Primary Examiner* — Paul N Dickson
*Assistant Examiner* — Wesley Potter
(74) *Attorney, Agent, or Firm* — Birch, Stewart, Kolasch & Birch, LLP

(57) ABSTRACT

A power unit for a small type vehicle wherein a speed change mechanism is disposed on a lateral side of a crankcase on the side of one end of a crankshaft. A valve operation controller for controlling the operations of valve operation mode change mechanisms and a speed change controller for controlling a speed change operation of a speed change mechanism are attached to an engine body, to lay out the valve operation controller and the speed change controller in good balance of center of gravity so as to prevent the center of gravity of the power unit from being deviated to one side. The valve operation controller and the speed change controller being attached to the engine body on the opposite side of the clutch device with respect to a vehicle body center line in a direction along the axis of the crankshaft.

10 Claims, 15 Drawing Sheets

POWER UNIT FOR SMALL TYPE VEHICLE WITH VALVE OPERATION CONTROLLER AND SPEED CHANGE CONTROLLER DISPOSED ON OPPOSITE SIDE OF CLUTCH DEVICE

CROSS-REFERENCE TO RELATED APPLICATIONS

The present application claims priority under 35 USC 119 to Japanese Patent Application No. 2007-341201 filed on Dec. 28, 2007 the entire contents of which are hereby incorporated by reference.

BACKGROUND OF THE INVENTION

1. Field of the Invention

The present invention relates to a power unit for a small type vehicle including an engine having a valve-operating device provided additionally with a valve operation mode change mechanisms capable of changing the operational modes of engine valves. A crankshaft is provided having an axis set along the vehicle width direction wherein the crankshaft is rotatably mounted on a crankcase of the engine. A speed change mechanism is provided in the course of a power transmission path for transmitting rotational power of the crankshaft to a drive wheel with the speed change mechanism being contained in the crankcase. A clutch device is provided for switching the making/breaking of power transmission between the crankshaft and the speed change mechanism, the clutch device is disposed on a lateral side of the crankcase on the side of one end of the crankshaft. A valve operation controller is provided for controlling the operations of the valve operation mode change mechanisms. A speed change controller is provided for controlling a speed change operation of the speed change mechanism with the valve operation controller and the speed change controller being attached to an engine body inclusive of the crankcase.

2. Description of Background Art

Japanese Patent Laid-Open No. 2003-232236 discloses a vehicle including a speed change controller for controlling the operation of an automatic transmission, and a valve operation controller for controlling the operation timings of engine valves.

In a power unit which has an engine with the axis of a crankshaft set along the vehicle width direction and which is mounted on a small type vehicle such as a motorcycle, a clutch device serving as a heavyweight body is disposed on a lateral side of a crankcase on the side of one end along the axial direction of the crankshaft. Thus, the layout of a valve operation controller and a speed change controller must be optimized so as to prevent the center of gravity of the power unit from being deviated to one side.

SUMMARY AND OBJECTS OF THE INVENTION

The present invention has been made in consideration of such a circumstance. Accordingly, it is an object of an embodiment of the present invention to provide a power unit for a small type vehicle in which a valve operation controller and a speed change controller are disposed in good balance so as to prevent the center of gravity of the power unit from being deviated to one side.

In order to attain the above object, a power unit for a small type vehicle is provided including an engine having a valve-operating device provided additionally with valve operation mode change mechanisms capable of changing operation modes of engine valves. A crankshaft includes an axis set along the vehicle width direction with the crankshaft rotatably bone on a crankcase of the engine. A speed change mechanism is provided in the course of a power transmission path for transmitting rotational power of the crankshaft to a drive wheel with the speed change mechanism being contained in the crankcase. A clutch device is provided for switching the making/breaking of power transmission between the crankshaft and the speed change mechanism. The clutch device is disposed on a lateral side of the crankcase on the side of one end of the crankshaft. A valve operation controller for controlling the operations of the valve operation mode change mechanisms is provided together with a speed change controller for controlling a speed change operation of the speed change mechanism. The valve operation controller and the speed change controller are attached to an engine body inclusive of the crankcase. The valve operation controller and the speed change controller are attached to the engine body on the opposite side of the clutch device with respect to a vehicle body center line in a direction along the axis of the crankshaft.

In addition, the valve operation controller and the speed change controller are attached to a side surface, along the vehicle body center line, of the engine body.

A clutch cover defines between itself and the crankcase a clutch chamber for containing the clutch device. The clutch cover is connected to the crankshaft with a clutch controller for controlling connection/disconnection operations of the clutch device being attached to the clutch cover A generator driven by power transmitted from the crankshaft is disposed on the opposite side of the clutch device in the axial direction of the crankshaft with a power generation voltage control driver for controlling a power generation voltage of the generator being attached to the inside of a generator cover connected to the crankcase so as to define between itself and the crankcase a generator containing chamber for containing the generator.

The speed change mechanism includes first and second input shafts parallel to each other with a single output shaft parallel to the input shafts. The clutch device is configured to be of a twin-clutch type including a first clutch interposed between the crankshaft and the first input shaft and a second clutch interposed between the crankshaft and the second input shaft.

In addition, intake valves 44 and exhaust valves 45 in an embodiment below correspond to the engine valves in the present invention with a rear bank side valve-operating device 48R in the embodiment corresponding to the valve-operating device in the invention. A gear speed change mechanism 103 in the embodiment corresponds to the speed change mechanism in the invention with a first main shaft 104 in the embodiment corresponding to the first input shaft in the invention. A second main shaft 105 in the embodiment corresponds to the second input shaft in the invention with a counter shaft 107 in the embodiment corresponding to the output shaft in the invention.

According to an embodiment of the present invention, the valve operation controller and the speed change controller are attached to the engine body on the opposite side of the clutch device, which is a heavyweight body, in a direction along the axis of the crankshaft. Therefore, it is possible to prevent the center of gravity of the power unit from being largely deviated to the side on which the clutch device is disposed. This ensures that the need to concentratedly lay out vehicle body component parts on the opposite side of the clutch device for the purpose of obtaining good balance of the center gravity of the vehicle body as a whole can be eliminated, and the degree of freedom in laying out the vehicle body component parts can be enhanced.

According to an embodiment of the present invention, the valve operation controller and the speed change controller are attached to the side surface, along the vehicle body center line, of the engine body. Therefore, maintenance of the valve operation controller and the speed change controller is facilitated.

According to an embodiment of the present invention, the valve operation controller and the speed change controller are attached to the engine body on the opposite side of the clutch device in the direction along the axis of the crankshaft. Therefore, the clutch device and the clutch controller can be disposed close to each other and in a compact form, while preventing the center of gravity of the power unit from being deviated to the side on which the clutch device, the clutch cover and the clutch controller are disposed.

According to an embodiment of the present invention, the generator, the generator cover and the power generation voltage control driver are disposed on the opposite side of the clutch device, which is a heavyweight body, in the direction along the axis of the crankshaft. This, in cooperation with the valve operation controller and the speed change controller, prevents the center of gravity of the power unit from being largely deviated to the side on which the clutch device is disposed.

According to an embodiment of the present invention, the clutch device is configured to be of the twin-clutch type. Therefore, though the weight of the clutch device is increased, the center of gravity of the power unit can be prevented from being largely deviated to the clutch device side, since the valve operation controller and the speed change controller are attached to the engine body on the opposite side of the clutch device in the direction along the axis of the crankshaft.

Further scope of applicability of the present invention will become apparent from the detailed description given hereinafter. However; it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, a mode for carrying out the present invention will be described below, based on an embodiment of the invention shown in the accompanying drawings.

FIGS. 1 to 15 show an embodiment of the present invention.

Figure 1:
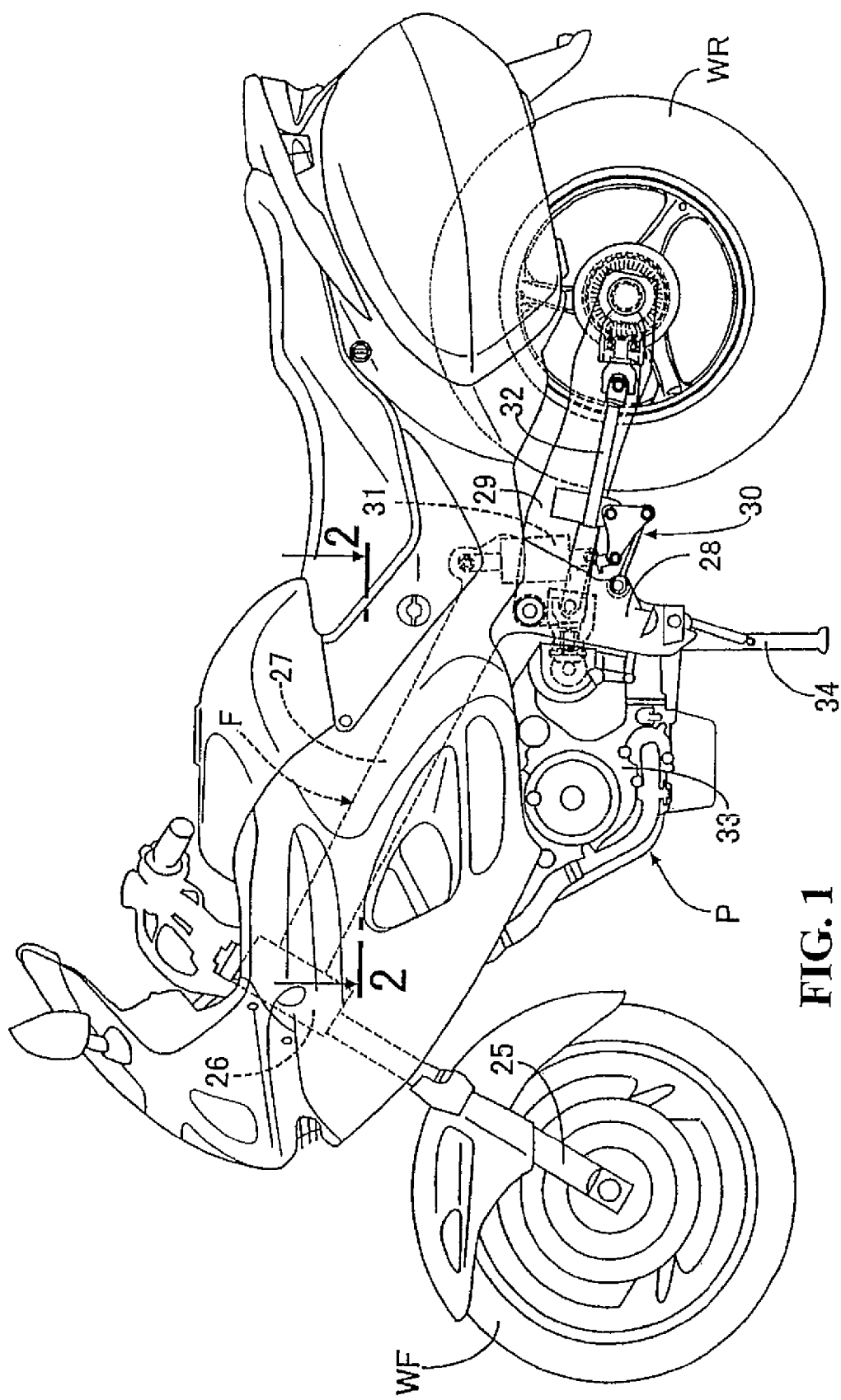
FIG. 1 is a left side view of a motorcycle.

As illustrated in FIG. 1, a body frame F of a motorcycle includes a head pipe 26 for steerably using a front fork 25 rotatably supporting a front wheel WF. The body frame F includes a left-right pair of main frames 27 extending rearwardly downwards from the head pipe 26 with a left-right pair of pivot plates 28 provided in connection with rear parts of both the main frames 27 and extending downwards. A rear wheel WR is rotatably supported on rear parts of swing arms 29 whose front ends are swingably borne on the pivot plates 28. In addition, links 30 are provided between lower parts of the pivot plates 28 and front parts of the swing arms 29 with shock absorbers 31 provided between upper parts of the pivot plates 28 and the links 30.

A power unit P is mounted in the state of being suspended from the main frames 27 and the pivot plates 28 with rotational power outputted from the power unit P being transmitted to the rear wheel WR through a drive shaft 32 extending in the front-rear direction.

Figure 2:
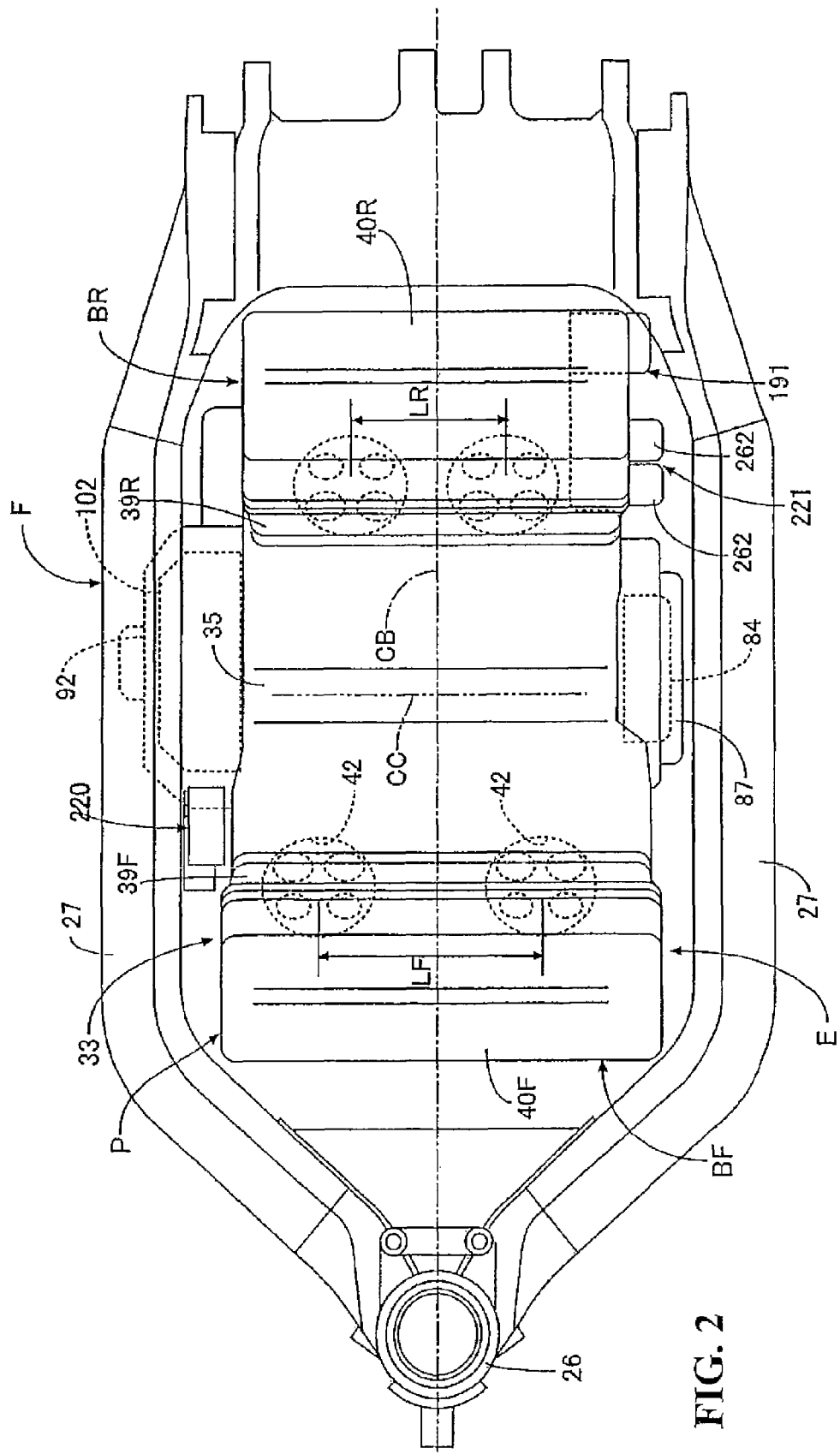
FIG. 2 is a plan view of a body frame and an engine body, as viewed along arrows of line 2-2 of FIG. 1.

Referring to FIG. 2 also, the power unit P has, for example, a 4-cylinder V-type engine E, and an engine body 33 of the engine E is disposed inside both the main frames 27, 27 in plan view. A side stand 34 is attached to the engine body 33 or the body frame F. In this embodiment, as shown in FIG. 1, the side stand 34 is attached to a lower part of the pivot plate 28 on the left side, of the body frame F. Therefore, when the side stand 34 is erected for parking, the motorcycle is inclined to the left side.

Figure 3:
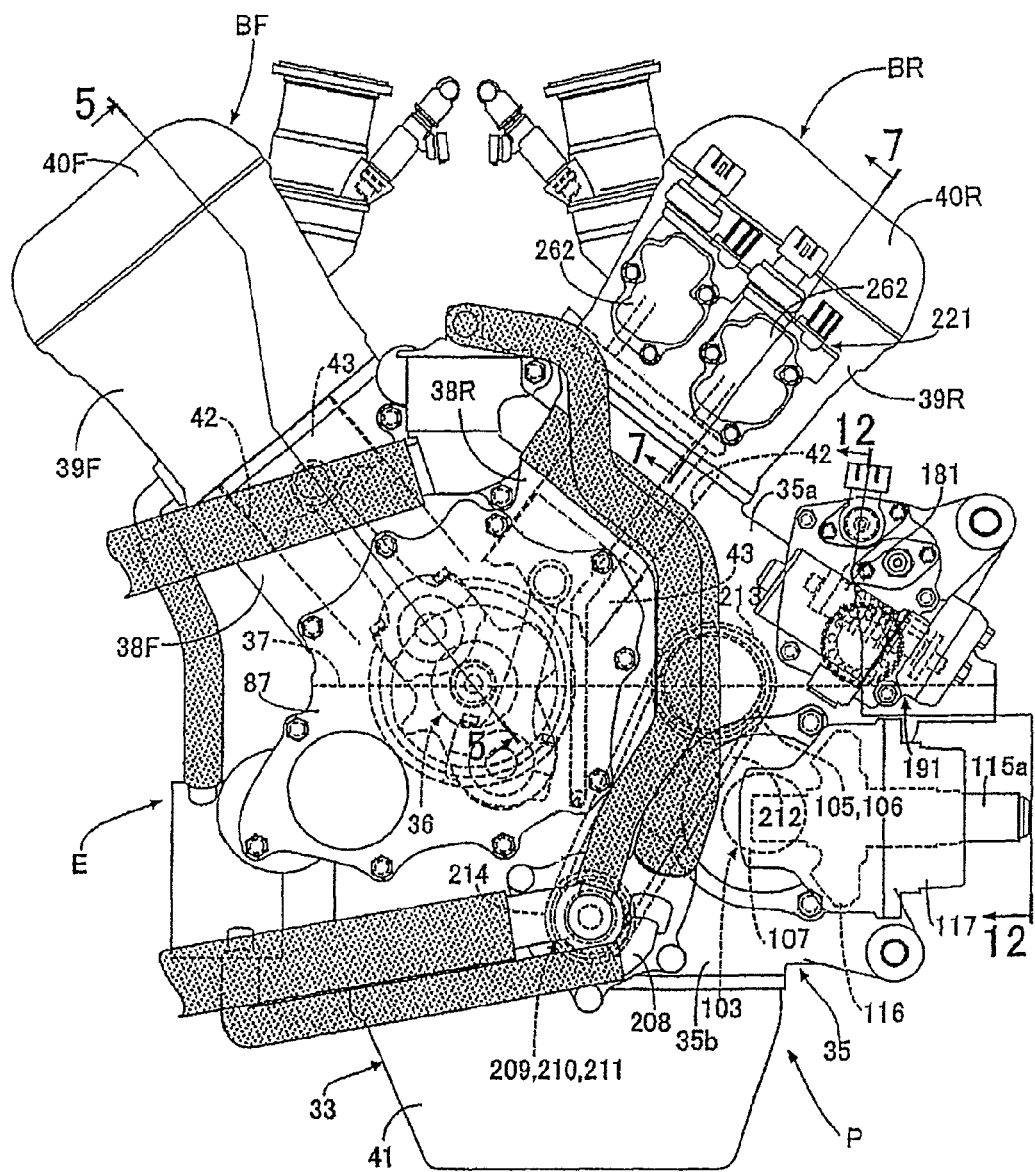
FIG. 3 is a left side view of a power unit.
Figure 4:
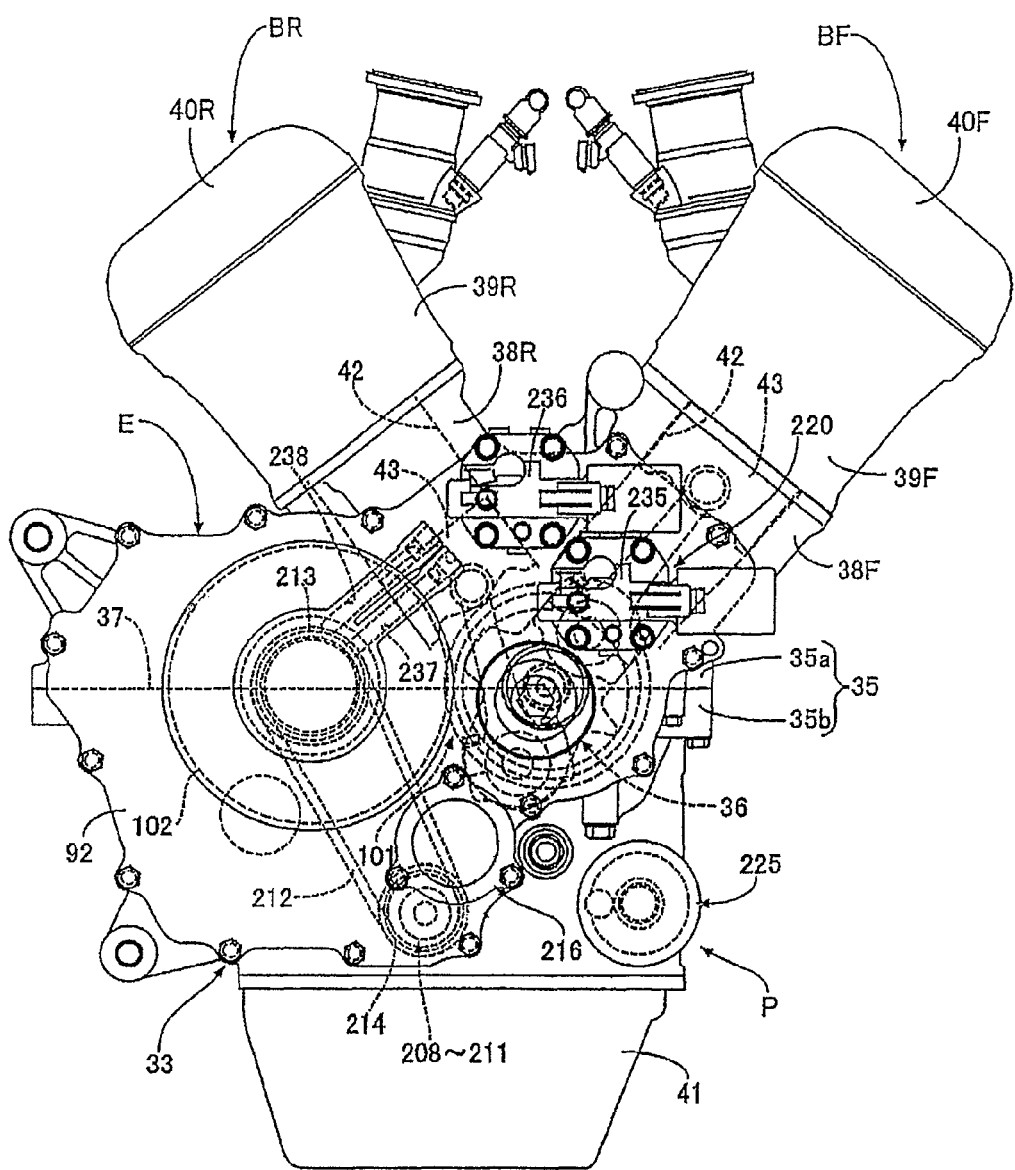
FIG. 4 is a right side view of the power unit.

In FIGS. 3 and 4, the engine body 33 of the engine E is configured to be of a V-type water-cooled system which includes a front bank BF disposed on the front side in its state of being mounted on the motorcycle, and a rear bank BR disposed on the rear side relative to the front bank BF. A crankshaft 36 extending along the vehicle width direction of the motorcycle, namely, along the left-right direction, is rotatably borne on a crankcase 35 shared by both the banks BF and BR.

The crankcase 35 has an upper case half 35$a$ and a lower case half 35$b$ coupled to each other. The front and rear banks BF and BR are formed integrally with the upper case half 35$a$ so that they are V-shaped in overall shape with the axis of the crankshaft 36 being disposed on the connecting surface 37 between the upper case half 35$a$ and the lower case half 35$b$.

The front bank BF is composed of a front cylinder block 38F integrally connected to the upper case half 35$a$ of the crankcase 35, a front cylinder head 39F connected to the front cylinder block 38F, and a front head cover 40F connected to the front cylinder head 39F. The rear bank BR is composed of a rear cylinder block 38R integrally connected to the upper case half 35$a$ of the crankcase 35, a rear cylinder head 39R connected to the rear cylinder block 38R, and a rear head cover 40R connected to the rear cylinder block 39R. An oil pan 41 is connected to a lower part of the crankcase 35.

The front cylinder block 38F is provided therein with two cylinder bores 42 arrayed in the axial direction of the crankshaft 36. The front cylinder block 38F is connected to the crankcase 35 in such a manner that the axes of the cylinder bores 42 are inclined forwardly upwards in the condition where the engine body 33 is suspended from the body frame F. Similarly, the rear cylinder block 38R is provided therein with two cylinder bores 42 arrayed in the axial direction of the crankshaft 36. The rear cylinder block 38R is connected to the crankcase 35 in such a manner that the axes of the cylinder bores 42 are inclined rearwardly upwards in the condition where the engine body 33 is suspended from the body frame F. Pistons 43 slidably fined respectively in both the cylinder bores 42 in the front bank BF and pistons 43 slidably fitted respectively in both the cylinder bores 42 in the rear bank BR are connected, in common, to the crankshaft 36.

As shown in FIG. 2, the interval LF between both the cylinder bores 42 in the front bank BE is set to be greater than the interval LR between both the cylinder bores 42 in the rear bank BR. The width of the rear bank BR in the axial direction of the crankshaft 36 is set to be smaller than that of the front bank BF so that the rear bank BR is hidden behind the front bank BF in front view.

Figure 5:
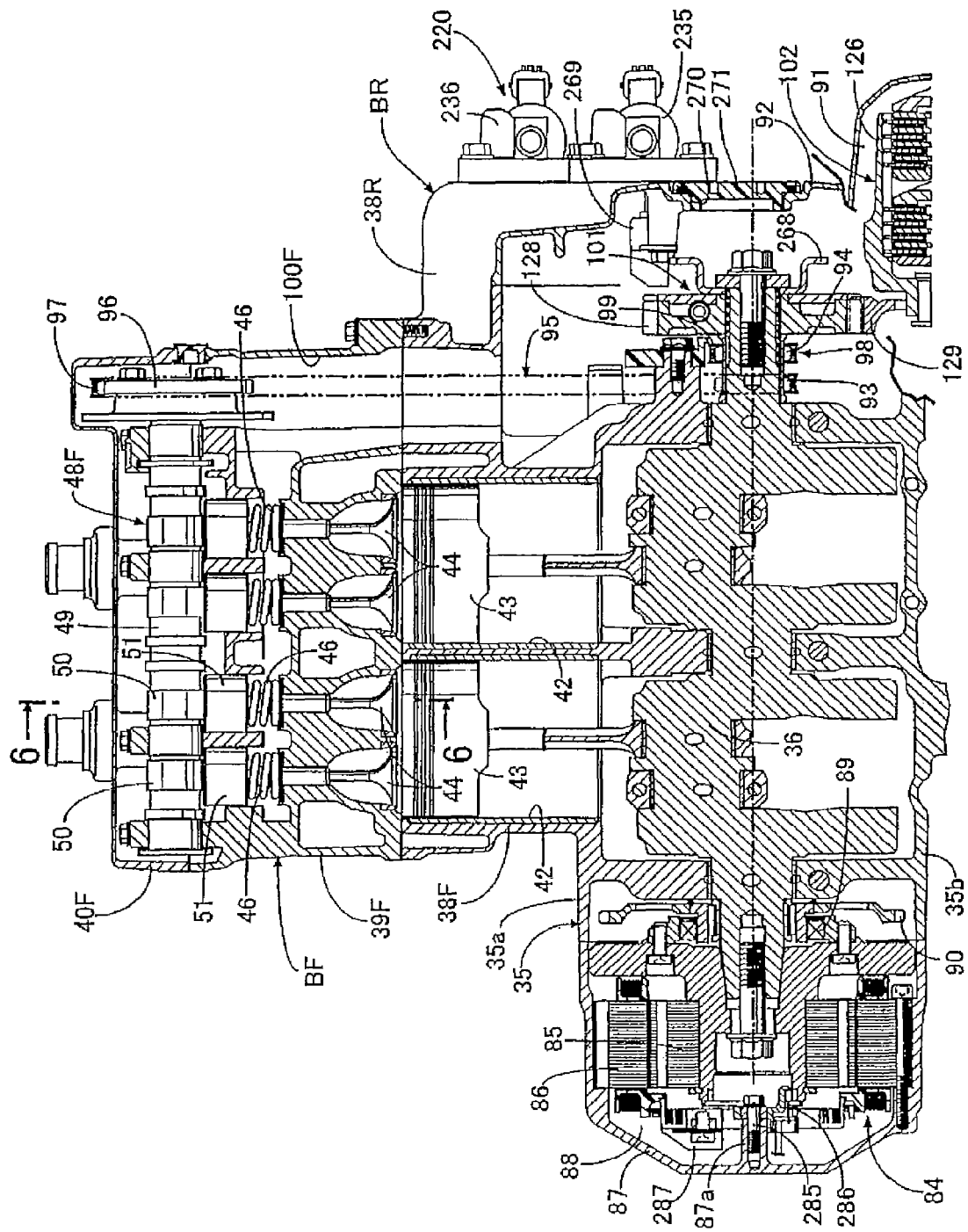
FIG. 5 is a sectional view taken along line 5-5 of FIG. 3.
Figure 6:
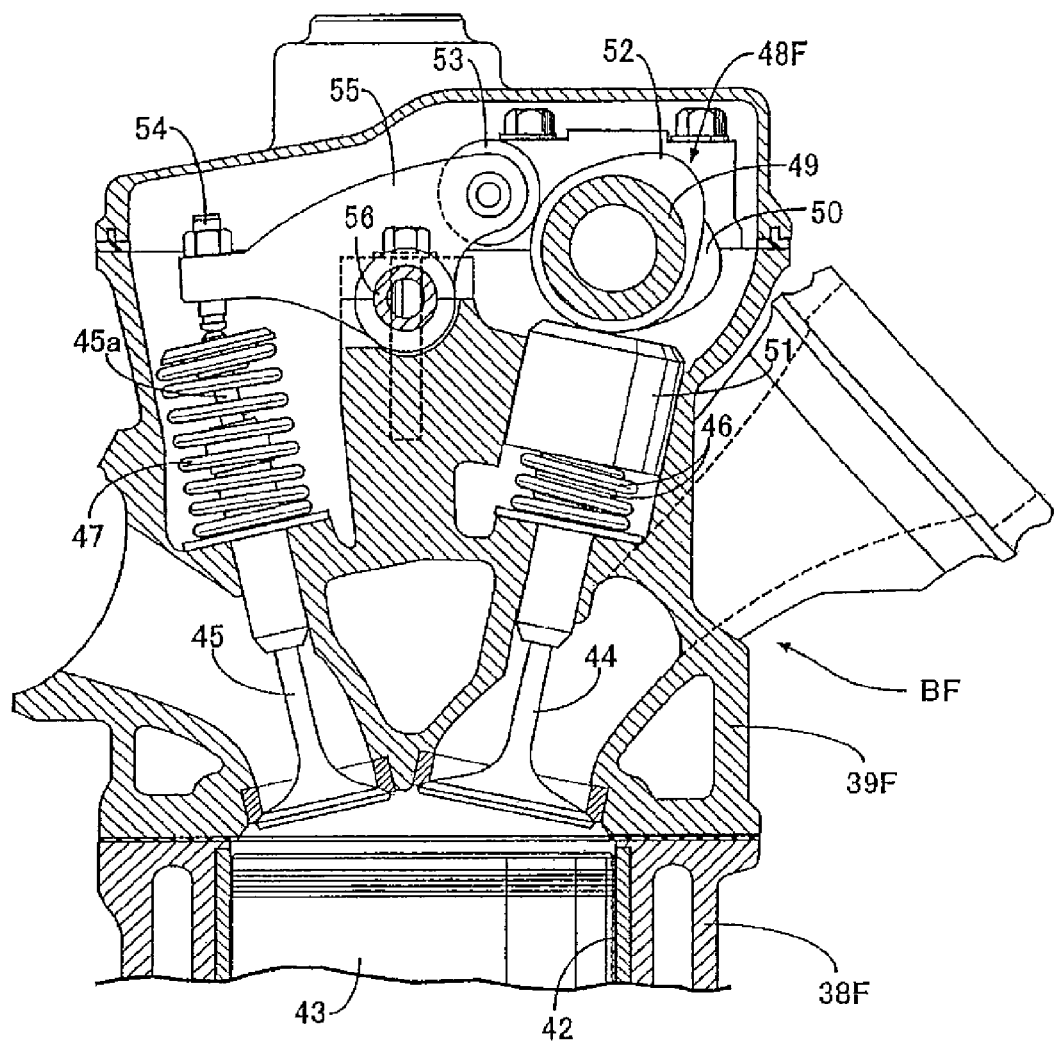
FIG. 6 is a sectional view taken along line 6-6 of FIG. 5.

In FIGS. 5 and 6, in the front cylinder head 39F, a pair each of intake valves 44 on the basis of each of the cylinder bores 42 are openably and closably disposed in the state of being urged in valve-closing directions by valve springs 46. A pair each of exhaust valves 45 on the basis of each cylinder bore are openably and closably disposed in the state of being urged in valve-closing directions by valve springs 47. The intake valves 44 and the exhaust valves 45 are driven to open and close by a front bank side valve-operating device 48F.

The front bank side valve-operating device 48F includes a camshaft 49 which is rotatably borne on the front cylinder head 39F while having its axis parallel to the crankshaft 36 and which is disposed on the upper side of the intake valves 44 with intake-side valve lifters 51, which are interposed between a plurality of (in this embodiment four) intake-side cams 50, being provided on the camshaft 49 and the intake valves 44. The intake-side lifters 51 are slidably fitted in the front cylinder head 39F with rocker arms 55 which are provided at their one-side ends with rollers 53 in rolling contact with a plurality of (in this embodiment, four) exhaust-side cams 52 provided on the camshaft 49 and of which other-side ends are screw engaged with tappet screws 54 making contact with the upper ends of stems 45a of the exhaust valves 45 so that the advanced/retracted positions of the tappet screws 54 can be controlled. The rocker arms 55 are swingably borne on a rocker shaft 56 which is fixed to the front cylinder head 39F while having its axis parallel to the camshaft 49.

Figure 7:
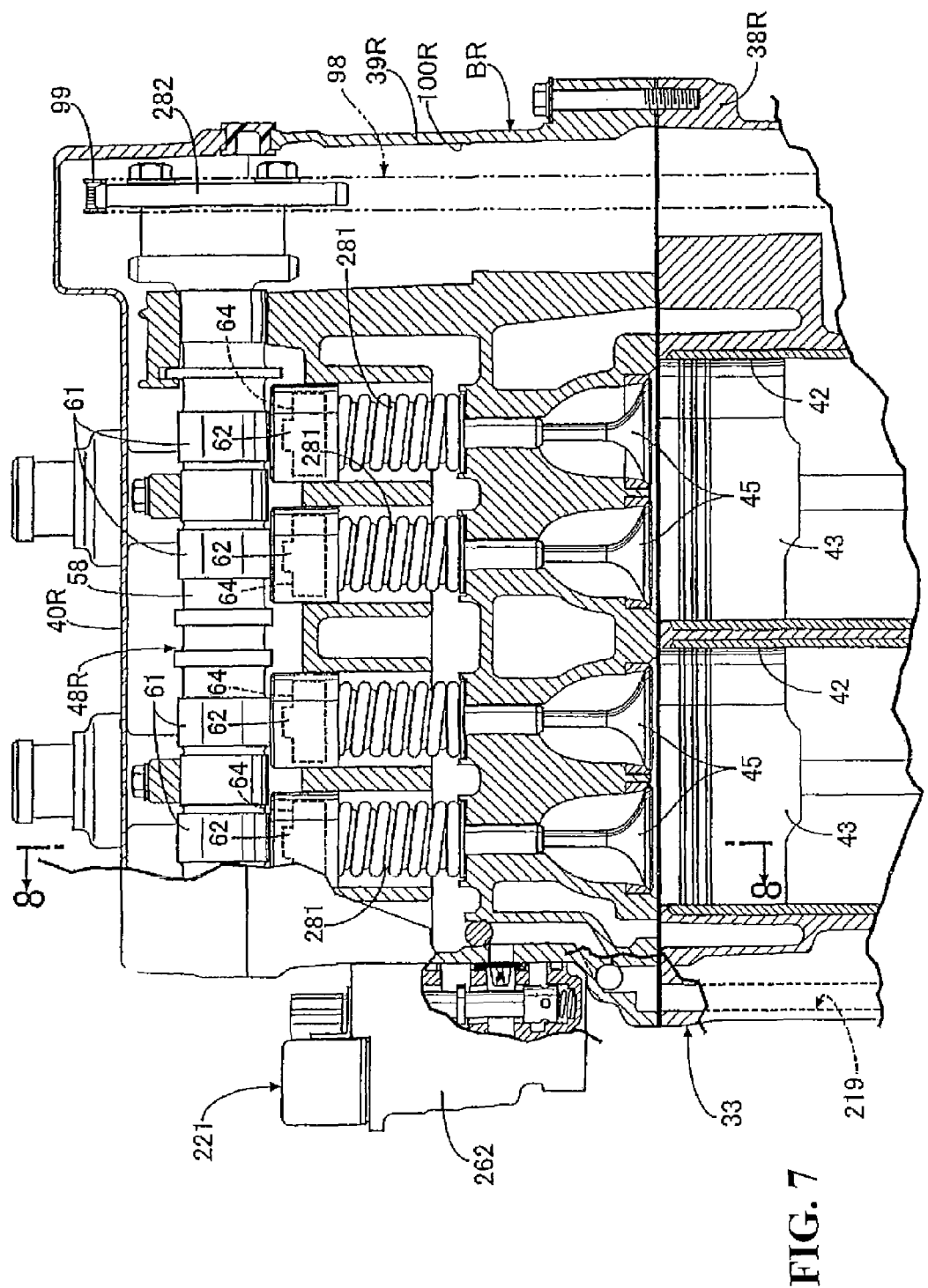
FIG. 7 is a sectional view taken along line 7-7 of FIG. 3.
Figure 8:
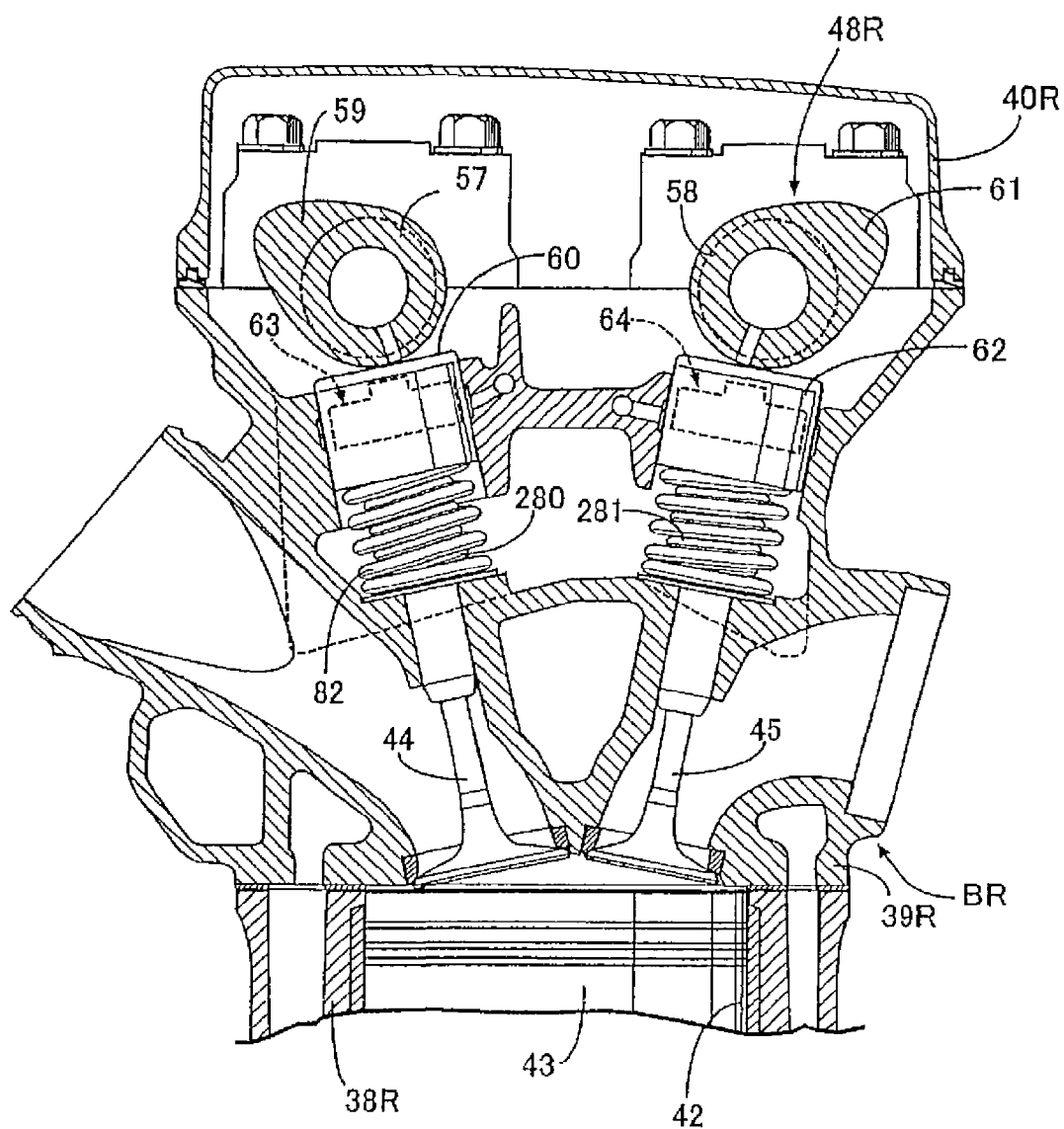
FIG. 8 is a sectional view taken along line 8-8 of FIG. 7.

In FIGS. 7 and 8, in the rear cylinder head 39R, a pair of intake valves 44 and a pair of exhaust valves 45 on the basis of each of the cylinder bores 42 are openably and closably disposed in the state of being urged in valve-closing directions by valve springs 280, 281. The intake valves 44 and the exhaust valves 45 are driven to open and close by a rear bank side valve-operating devices 48R.

The rear bank side valve-operating device 48R includes an intake-side camshaft 57 which is rotatably borne on the rear cylinder head 39R while having its axis parallel to the crankshaft 36 and which is disposed on the upper side of the intake valves 44. An exhaust-side camshaft 58 is rotatably borne on the rear cylinder head 39R while having its axis parallel to the crankshaft 36 which is disposed on the upper side of the exhaust valves 45. Intake-side valve lifters 60 are interposed between a plurality of (in this embodiment, four) intake-side cams 59 provided on the intake-side camshaft 57 and the intake valves 44 which are slidably fitted in the rear cylinder head 39R. Exhaust-side valve lifters 62 are interposed between a plurality of (in this embodiment, four) exhaust-side cams 61 provided on the exhaust-side camshaft 58 and the exhaust valves 45 which are slidably fitted in the rear cylinder head 39R.

Moreover, in the rear bank side valve-operating device 48R, an intake-side valve operation mode changing mechanism 63 wherein the operation mode of the intake valves 44 in the rear bank BR can be switched between an opening/closing operation condition and a valve closed rest condition, and an exhaust-side valve operation mode changing mechanism 64 wherein the operation mode of the exhaust valves 45 can be switched between an opening/closing operation condition and a valve closed rest condition, are additionally provided.

Figure 9:
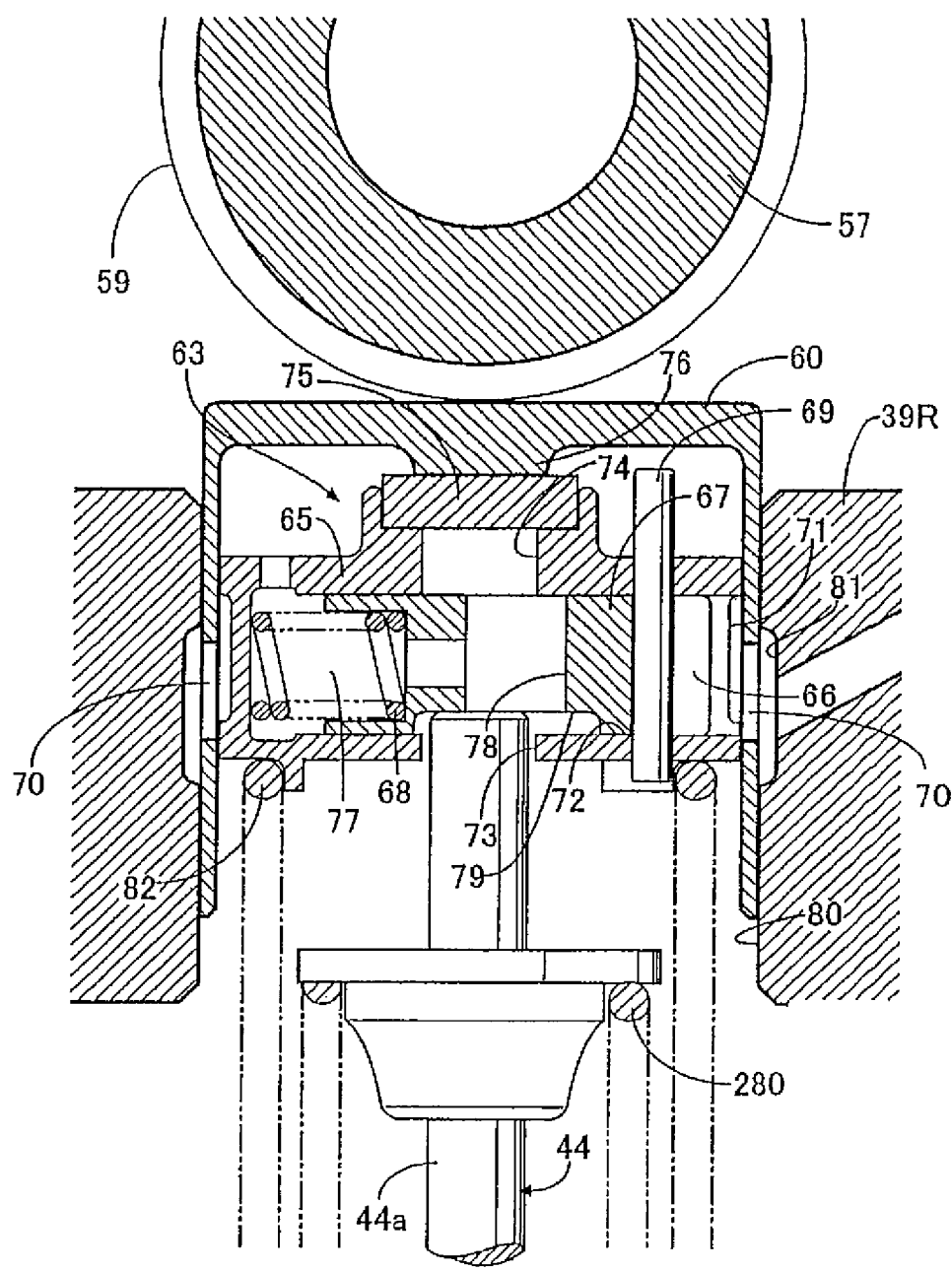
FIG. 9 is an enlarged sectional view of an essential part of FIG. 8.

In FIG. 9, the intake-side valve operation changing mechanism 63 includes a pin holder 65 which is provided in relation to the intake-side valve lifters 60 and which is slidably fitted in the intake-side valve lifter 60 A slide pin 67 is slidably fitted in the pin holder 65 so as to define an oil pressure chamber 66 between itself and the inside surface of the intake-side valve lifter 60. A return spring 68 is provided between the slide pin 67 and the pin holder 65 so as to produce a spring force for urging the slide pin 67 in the direction of reducing the volume of the oil pressure chamber 66. A stopper pin 69 is provided between the pin holder 65 and the slide pin 67 so as to inhibit rotation about the axis of the slide pin 67.

The pin holder 65 is provided with an annular groove 71 in the outer periphery thereof. In addition, the pin holder 65 that is provided with a bottomed slide hole 72 which has an axis orthogonal to the axis of the intake-side valve lifter 60, is opened at its one end into the annular groove 71, and is closed at its other end. In addition, the pin holder 65 is provided with an insertion hole 73 through which to insert a tip part of a stem 44a of the intake valve 44 urged in the valve-closing direction by the valve spring 280, and with an extension hole 74 which is so formed wherein the slide hole 72 is located between the extension hole 74 and the insertion hole 73. The insertion hole 73 and the extension hole 74 are coaxially provided so that a tip part of the stem 44a of the intake valve 44 can be contained therein. A disk-like shim 75 for closing an end part of the extension hole 74 on the side of a closed end of the intake-side valve lifter 60 is fitted into the pin holder 65 with a projected part 76 making contact with the shim 75 being integrally formed at a central part of the inside surface of the closed end of the intake-side valve lifter 60.

The slide pin 67 is slidably fitted in the slide hole 72 in the pin holder 65. The oil pressure chamber 66 communicating with the annular groove 71 is formed between one end of the slide pin 67 and the inside surface of the intake-side valve lifter 60, and the return spring 68 is contained in a spring chamber 77 formed between the other end of the slide pin 67 and the closed end of the slide hole 72.

In an intermediate part in the axial direction of the slide pin 67, a containing bole 78 capable of coaxially communicating with the insertion hole 73 and the extension hole 74 is provided so that a tip part of the stem 44a is contained therein. An end part, on the side of the insertion hole 73, of the containing hole 78 is opened to a flat contact surface 79 formed at an outside surface of a lower part of the slide pin 67 so as to be face the insertion hole 73. The contact surface 79 is formed to be comparatively long along the axial direction of the slide pin 67, and the containing hole 78 is opened into a part, on the side of the oil pressure chamber 66, of the contact surface 79.

The slide pin 67 as described above is slid in the axial direction in such a manner that an oil pressure force exerted on one end side of the slide pin 67 by the oil pressure in the oil pressure chamber 66 and a spring force exerted on the other end side of the slide pin 67 by the return spring 68 balance each other. At a non-operation time when the oil pressure in the oil pressure chamber 66 is low, the slide pin 67 is moved toward the right side in FIG. 9 so that the containing hole 78 is deviated from the axis of the insertion hole 73 and the extension hole 74, and the tip of the stem 44a is brought into contact with the contact surface 79. In an operating condition where the oil pressure in the oil pressure chamber 66 is high, the slide pin 67 is moved toward the left side in FIG. 9 so that the tip part of the stem 44a being inserted through the insertion hole 73 is contained into the containing hole 78 and the extension hole 74.

When the slide pin 67 is moved to such a position that the containing hole 78 coaxially communicates with the insertion hole 73 and the extension hole 74, the intake-side valve lifter 60 is slid by a pressing force exerted from the intake-side cam 59, and, attendant on this, the pin holder 65 and the slide pin 67 are also moved to the side of the intake valve 44 together with the intake-side valve lifter 60. However, this results in that only the tip part of the stem 44a is contained into the containing hole 78 and the extension hole 74, and no pressing force in the valve-opening direction is exerted on the intake valve 44 from the intake-side valve lifter 60 and the pin holder 65, so that the intake valve 44 remains at rest. When the slide pin 67 is moved to such a position that the tip part of the stem 44a is put into contact with its contact surface 79, the intake-side valve lifter 60 is slid by a pressing force exerted from the intake-side valve-operating cam 59, the pin holder 65 and the slide pin 67 are moved toward the side of the intake valve 44 accordingly, and, attendant on this, a pressing force in the valve-opening direction is exerted on the intake valve 44, so that the intake valve 44 is operated to open and close according to the rotation of the intake-side cam 59.

The rear cylinder head 39R is provided with support holes 80 in which the intake-side valve lifters 60 are to be fitted so that the intake-side valve lifters 60 are slidably borne. The support holes 80 are provided in their inside surfaces with annular recesses 81 in such a manner as to surround the intake-side valve lifters 60. The intake-side valve lifters 60 are each provided with a plurality of communication holes 70 through which the annular recesses 81 are permitted to communicate with the annular grooves 71, irrespectively of the sliding of the intake-side valve lifters 60 in the support holes 80. In addition, springs 82 for urging the intake-side valve lifters 60 in the direction for making contact with the intake-side cams 59 are provided between the intake-side valve lifters 60 and the rear cylinder head 39R.

The exhaust-side valve operation mode changing mechanism 64 is provided in relation to the exhaust-side valve lifters 62 while being configured in the same manner as the intake-side valve operation mode changing mechanism 63, and it can be switched between a condition where the exhaust valve 45 is closed to a rest state when a high oil pressure is exerted and a condition where the exhaust valve 45 is put into an opening/closing operation when the oil pressure exerted thereon is lowered.

In other words, the rear bank side valve-operating device 48R can switch between a condition where the intake valves 44 and the exhaust valves 45 of the two cylinders in the rear bank BR are put into opening/closing operations and a condition where the intake valves 44 and the exhaust valves 45 are closed to a rest state so as to obtain a cylinder rest state, by operation control of the intake-side valve operation mode changing mechanisms 63 and the exhaust-side valve operation mode changing mechanisms 64.

Again in FIG. 5, a generator 84 is connected to a left end part of the crankshaft 36 in the condition where the engine body 33 is mounted on the body frame F. The generator 84 is composed of an inner rotor 85 fixed to the crankshaft 36 and an outer stator 86 surrounding the inner rotor 85, and is contained in a generator containing chamber 88 defined by the crankcase 35 and a generator cover 87 connected to a left side surface of the crankcase 35. The stator 86 is fixed to the generator cover 87.

A support projected part 87a is projectedly provided at an inside surface of a central part of the generator cover 87. A bus ring 286 is firmly attached to the support projected part 87a through a screw member 285, and the outer stator 86 is provided in connection to the bus ring 286. A power generation voltage control driver 287 for controlling the power generation voltage of the generator 84 is attached to the bus ring 286. Thus, the power generation voltage control driver 287 is attached to the generator cover 87 through the ring 286.

A gear 90 is connected to the rotor 86 through a one-way clutch 89 capable of power transmission to the side of the rotor 86 with power from a starting motor (not shown) being transmitted to the gear 90.

On the other hand, to the right side surface of the crankcase 35 in the condition where the engine body 33 is mounted on the body frame F, a clutch cover 92 defining a clutch chamber 91 between itself and the crankcase 35 is connected. In the clutch chamber 91, drive sprockets 93 and 94 are fixed to the crankshaft 36. The drive sprocket 93 on one side constitutes a part of a front bank side timing power transmission mechanism 95 by which the rotational power of the crankshaft 36 is transmitted, at a reduction ratio of 1/2, to the camshaft 49 in the front bank side valve-operating device 48F. The front bank side timing power transmission mechanism 95 has a configuration in which an endless cam chain 97 is wrapped around the drive sprocket 93 and a driven sprocket 96 provided at one end part (a right end part in the condition where the power unit P is mounted on the body frame F) of the camshaft 49.

The drive sprocket 94 on the other side constitutes a part of a rear bank side timing power transmission mechanism 98 by which the rotational power of the crankshaft 36 is transmitted, at a reduction ratio of 1/2, to the intake-side and exhaust-side camshafts 57 and 58 in the rear bank side valve-operating device 48R. The rear bank side timing power transmission mechanism 98 has a configuration in which an endless cam chain 99 is wrapped around the drive sprocket 94 and driven sprockets 282 (see FIG. 7) provided respectively at one-side end parts (right end parts in the condition where the power unit P is mounted on the body frame F) of the intake-side and exhaust-side camshafts 57 and 58.

The front cylinder block 38F and the font cylinder head 39F are provided with a cam chain chamber 100F in which the cam chain 97 runs, while the rear cylinder block 38R and the rear cylinder head 39R are provided with a cam chain chamber 100R in which the cam chain 99 runs.

Figure 10:
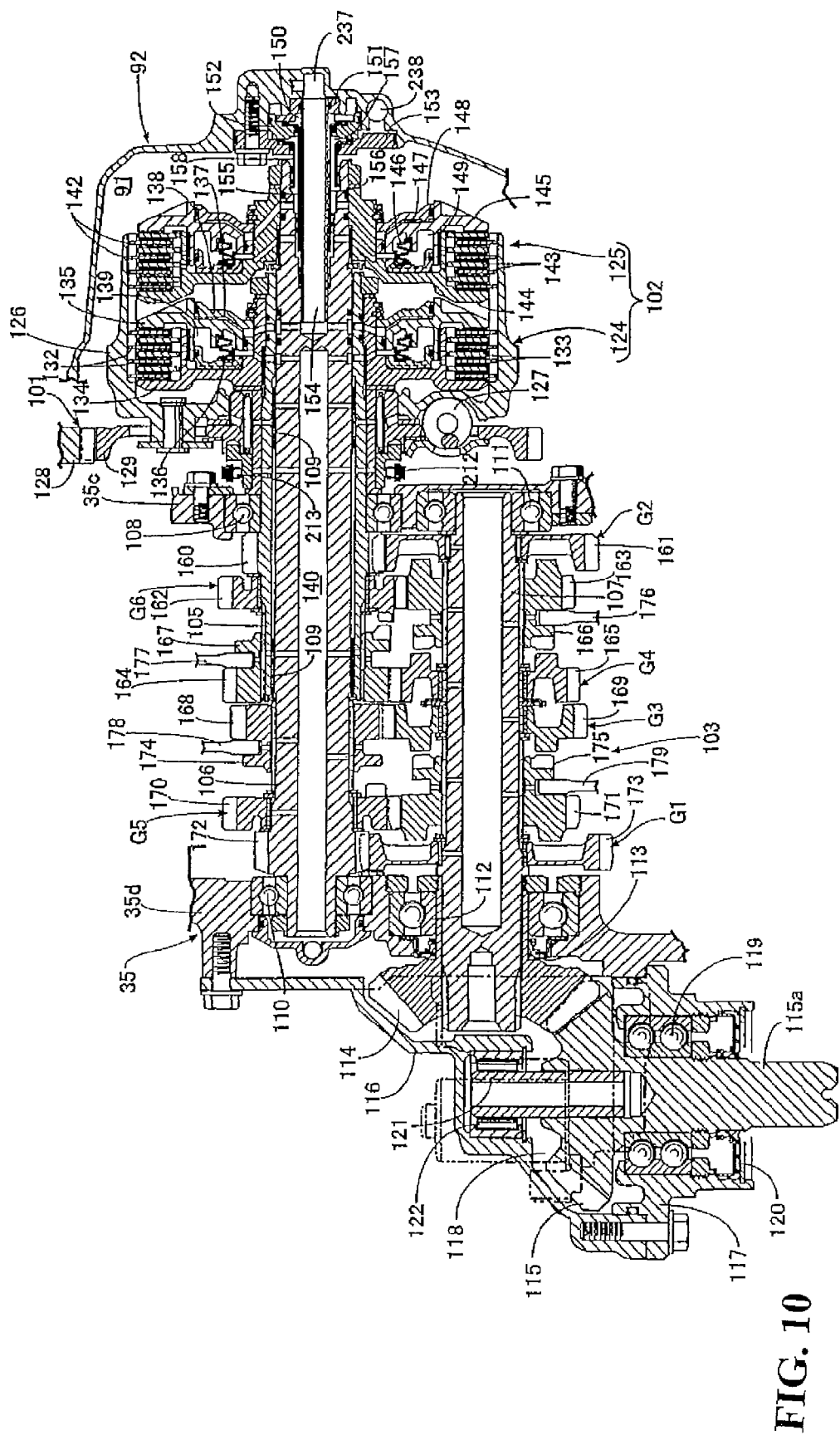
FIG. 10 is a longitudinal sectional view of a gear speed change mechanism and a clutch device.

Referring to FIG. 10 also, the power transmission path between the crankshaft 36 and the rear wheel WR includes primary reduction gears 101, a clutch device 102, a gear speed change mechanism 103 and the drive shaft 32 (see FIG. 1) in this order from the side of the crankshaft 36. The primary reduction gears 101 and the clutch device 102 are contained in the clutch chamber 91, whereas the gear speed change mechanism 103 is contained in the crankcase 35.

The gear speed change mechanism 103 has a plurality of gear trains for a plurality of shift positions (gear speeds), for example, 1st to 6th speed gear trains G1, G2, G3, G4, G5, and G6 which can be selectively established. The 2nd, 4th and 6th speed gear trains G2, G4 and G6 are provided between a first main shaft 105 and a counter shaft 107, while the 1st, 3rd and 5th speed gear trains G1, G3 and G5 are provided between a second main shaft 106 coaxially and relatively rotatably penetrating the first main shaft 105 and the counter shaft 107.

The crankcase 35 includes a pair of side walls 35c and 35d which are opposed to each other, with a spacing therebetween in the axial direction of the crankshaft 36. An intermediate part of the first main shaft 105 formed in a hollow cylindrical shape having an axis parallel to the crankshaft 36 rotatably penetrates the side wall 35c, and a ball bearing 108 is interposed between the side wall 35c and the first main shaft 105. In addition, the second main shaft 106 having an axis parallel to the crankshaft 36 rotatably penetrates the first main shaft 105 in such a manner that relative positions of the first main shaft 105 and the second main shaft 106 in the axial direction are fixed. A plurality of needle bearings 109 are interposed between the first main shaft 105 and the second main shaft 106. In addition, the other end part of the second main shaft 106 is rotatably borne on the side wall 35d of the crankcase 35 through a ball bearing 110.

One end part of the counter shaft 107 having an axis parallel to the crankshaft 36 is rotatably borne on the side wall 35c through a ball bearing 111. The other end part of the counter shaft 107 rotatably penetrates the side wall 35d, with a ball bearing 112 and an annular seal member 113 being interposed between the other end part and the side wall 35d. A drive bevel gear 114 is fixed to a projected end part, projecting from the side wall 35d, of the counter shaft 107. A driven bevel gear 115 having an axis of rotation extending in the front-rear direction of the motorcycle is meshed with the drive bevel gear 114.

The drive bevel gear 114 and the driven bevel gear 115 are meshed with each other in a gear chamber 118 which is defined by a first gear cover 116 detachably connected to the side wall 35d of the crankcase 35 while covering a part of the side wall 35d, a second gear cover 117 which is detachably connected to the first gear cover 116, and the side wall 35d. A shaft part 115a coaxially possessed by the driven bevel gear 115 rotatably penetrates the second gear cover 117. A ball bearing 119 and an annular seal member 120 located on the outer side of the ball bearing 119 are interposed between the shaft part 115a and the second gear cover 117. One end part of a support shaft 121 is fitted to the driven bevel gear 115, and the other end part of the support shaft 121 is rotatably borne on the first gear cover 116 through a roller bearing 122. The shaft 115a is connected to the drive shaft 32.

Figure 11:
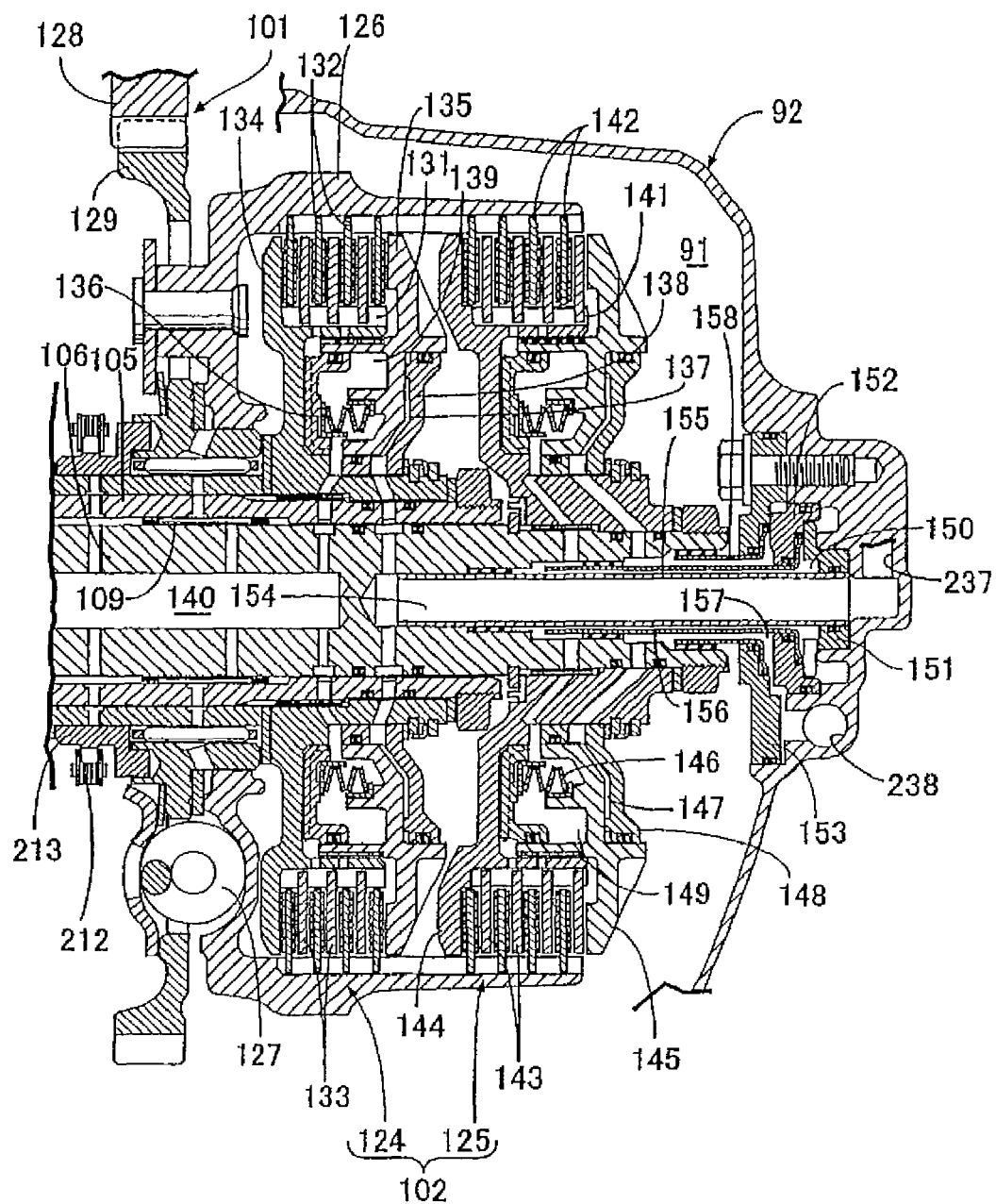
FIG. 11 is an enlarged view of an essential part of FIG. 10.

Referring to FIG. 11, the clutch device 102 is configured to be of a twin type, having first and second clutches 124 and 125 which are provided between the gear speed change mechanism 103 and the crankshaft 36. The clutch device 102 is contained in the clutch chamber 91 while being disposed on a lateral side of the crankcase 35 on one end side opposite to the side of the generator 84 of the crankshaft 36, specifically, on the right side of the crankcase 35 in the condition where the engine body 33 is mounted on the body frame F.

The first clutch 124 is provided between the crankshaft 36 and one end part of the first main shaft 105, while the second clutch 125 is provided between the crankshaft 36 and one end part of the second main shaft 106. The power from the crankshaft 36 is inputted to a clutch outer 126 provided in common for the first and second clutches 124, 125 through the primary reduction gears 101 and a damper spring 127.

The primary reduction gears 101 include a drive gear 128 provided on the crankshaft 36 on the outer side relative to the drive sprocket 94, and a driven gear 129 relatively rotatably borne on the main shaft 105 and meshed with the drive gear 128. The driven gear 129 is connected to the clutch outer 126 through the damper spring 127.

As shown in FIG. 5 a pulser 268 is attached to a shaft end of the crankshaft 36 on the outer side relative to the primary reduction gears 101, and a rotating speed detector 269 for detecting the rotating speed of the crankshaft 36 by detecting the pulser 268 is attached to the inside surface of the clutch cover 92. In addition, the clutch cover 92 is provided with an inspection hole 270 for inspection of the pulser 268. The inspection hole 270 is provided in the clutch cover 92 with an offset from the axis of the crankshaft 36 so as to be minimized in diameter with the inspection hole 270 being closed with a detachable lid member 271.

The first clutch 124 includes the clutch outer 126; a first clutch inner 131 coaxially surrounded by the clutch outer 126 and relatively non-rotatably connected to the first main shaft 105; a plurality of first friction disks 132 relatively non-rotatably engaged with the clutch outer 126; a plurality of second friction disks 133 relatively non-rotatably engaged with the first clutch inner 131 and disposed alternately with the first friction disks 132; a first pressure receiving plate 134 provided at the first clutch inner 131 oppositely to the first and second friction disks 132, 133 disposed in the manner of overlapping with each other; a first piston 135 clamping the first and second friction disks 132, 133 between itself and the first pressure receiving plate 134; and a first spring 136 for urging the first piston 135.

An end wall member 138 defining a first oil pressure chamber 137 (on which a back surface of the first piston 135 fronts) between itself and the first piston 135 is disposed in the state of being fixed to the first clutch inner 131. According to an increase in the oil pressure inside the first oil pressure chamber 137, the first piston 135 operates to clamp the first and second friction disks 132, 133 between itself and the first pressure receiving plate 134, whereby the first clutch 124 is put into a connected state in which the power transmitted from the crankshaft 36 to the clutch outer 126 is transmitted to the first main shaft 105. In addition, a canceller chamber 139 on which a front surface of the first piston 135 fronts is formed between the first clutch inner 131 and the first piston 135, and the first spring 136 is contained in the canceller chamber 139 so as to produce a spring force toward the side for reducing the volume of the first oil pressure chamber 137.

The canceller chamber 139 communicates with a first oil passage 140 coaxially provided in the second main shaft 106 for the purpose of supplying oil to lubricated parts of the gear speed change mechanism 103 and into the area between the first and second main shafts 105 and 106. Therefore, even when a centrifugal force attendant on the rotation is exerted on the oil in the first oil pressure chamber 137 in a reduced-pressure condition so as to produce a force for pressing the first piston 135, a centrifugal force is similarly exerted also on the oil in the canceller chamber 139, so that the first piston 135 is prevented from being non-desiredly moved to the side of clamping the first and second friction disks 132, 133 between itself and the first pressure receiving plate 134.

The second clutch 125 is disposed in an array with the first clutch 124 in the axial direction of the second main shaft 106 in such a manner that the first clutch 124 is interposed between the second clutch 125 and the primary reduction gears 101. The second clutch 125 includes the clutch outer 126; a second clutch inner 141 coaxially surrounded by the clutch outer 126 and relatively non-rotatably connected to the second main shaft 106; a plurality of third friction disks 142 relatively non-rotatably engaged with the clutch outer 126; a plurality of fourth friction disks 143 relatively non-rotatably engaged with the second clutch inner 141 and disposed alternately with the third friction disks 142; a second pressure receiving plate 144 provided at the second clutch inner 141 oppositely to the third and fourth friction disks 142, 143 mutually overlapping with each other; a second piston 145 for clamping the third and fourth friction disks 142, 143 between itself and the second pressure receiving plate 144 and a second spring 146 for urging the second piston 145.

An end wall member 148 defining a second oil pressure chamber 147 (on which a back surface of the second piston 145 fronts) between itself and the second piston 145 is disposed in the state of being fixed to the second clutch inner 141. According to an increase in the oil pressure in the second oil pressure chamber 147, the second piston 145 operates to clamp the third and fourth friction disks 142, 143 between itself and the second pressure receiving plate 144, whereby the second clutch 125 is put into a connected state in which the power transmitted from the crankshaft 36 to the clutch outer 126 is transmitted to the second main shaft 106. In addition, a canceller chamber 149 on which a front surface of the second piston 145 fronts is formed between the second clutch inner 141 and the second piston 145, and the second spring 146 is contained in the canceller chamber 149 so as to produce a spring force toward the side of reducing the volume of the second oil pressure chamber 147.

The canceller chamber 149 communicates with a second oil passage 150 which will be described later. Therefore, even when a centrifugal force attendant on the rotation is exerted on the oil in the second oil pressure chamber 147 in a reduced-pressure condition so as to produce a force for pressing the second piston 145, a centrifugal force is similarly exerted also on the oil in the canceller chamber 149, so that the second piston 145 is prevented from being undesiredly moved toward the side of clamping the third and fourth friction disks 142, and 143 between itself and the second pressure receiving plate 144.

First, second and third partition members 151, 152, 153 are attached to the inner surface side of the clutch cover 92 covering the first and second clutches 124, 125 from the right side as viewed toward the front side with respect to the operating direction of the motorcycle. A first tubular member 155 for forming a first oil passage 154 communicating with the first oil pressure chamber 137 of the first clutch 124 is provided between the second main shaft 106 and the first partition member 151. A second tubular member 156 coaxially surrounding the first tubular member 155 so as to define an annular second oil passage 150, which communicates with the canceller chamber 149 of the second clutch 125, between itself and the first tubular member 155 is provided between the second main shaft 106 and the second partition member 152. A third tubular member 158 coaxially surrounds the second tubular member 156 so as to define an annular second oil passage 157 which communicates with the second oil pressure chamber 147 between itself and the second tubular member 156 provided between the second main shaft 106 and the third partition member 153.

As illustrated in FIG. 10, the 4th speed gear train G4, the 6th speed gear train G6 and the 2nd speed gear train G2 arrayed in this order from the opposite side of the clutch device 102 are provided between the first main shaft 105 and the counter shaft 107 in the gear speed change mechanism 103. The 2nd speed gear train G2 is composed of a 2nd speed drive gear 160 provided integrally with the first main shaft 105, and a 2nd speed driven gear 161 relatively rotatably borne on the counter shaft 107 and meshed with the 2nd speed drive gear 160. The 6th speed gear train G6 is composed of a 6th speed drive gear 162 relatively rotatably borne on the first main shaft 105, and a 6th speed driven shaft 163 being relatively non-rotatably borne on the counter shaft 105 so as to be axially movable and is meshed with the 6th speed drive gear 162. The 4th speed gear train G4 is composed of a 4th speed drive gear 164 relatively non-rotatably borne on the first main shaft 105 so as to be axially movable, and a 4th speed driven gear 165 relatively rotatably borne on the counter shaft 107 and meshed with the 4th speed drive gear 164.

A first shifter 166 capable of switching between a state of being engaged with the 2nd speed driven gear 161, a state of being engaged with the 4th speed driven gear, and a state of being engaged with neither the 2nd driven gear 161 nor the 4th speed driven gear 165, is relatively non-rotatably and axially movably borne on the counter shaft 107 between the 2nd speed driven gear 161 and the 4th speed driven gear 165. The first shifter 166 is integrally provided with the 6th speed driven gear 163. In addition, the 4th speed drive gear 164 is provided as one body with a second shifter 167, which is relatively non-rotatably and axially movably borne on the first main shaft 105. The second shifter 167 can be switchedly engaged with and disengaged from the 6th speed drive gear 162.

When the first shifter 166 is engaged with the 2nd speed driven gear 161 in the condition where the second shifter 167 is not engaged with the 6th speed drive gear 162, the 2nd speed gear train G2 is established. When the first shifter 166 is engaged with the 4th speed driven gear 165 in the condition where the second shifter 167 is not engaged with the 6th speed drive gear 162, the 4th speed gear train G4 is established. When the first shifter 166 is put into a neutral state and the second shifter 167 is engaged with the 6th speed drive gear 162, the 6th speed gear train G6 is established.

The 1st speed gear train G1, the 5th speed gear train G5 and the 3rd speed gear train G3 arrayed in this order from the opposite side of the clutch device 102 are provided between the projecting part, projecting from the other end part of the first main shaft 105, of the second main shaft 106 and the counter shaft 107. The 3rd speed gear train G3 is composed of a 3rd speed drive gear 168 relatively non-rotatably borne on the second main shaft 106 so as to be axially movable, and a 3rd speed driven gear 169 relatively rotatably borne on the counter shaft 107 and meshed with the 3rd speed drive gear 168. The 5th speed gear train G5 is composed of a 5th speed drive gear 170 relatively rotatably borne on the second main shaft 106, and a 5th speed driven gear 171 being relatively non-rotatably borne on the counter shaft 107 so as to be axially movale and being meshed with the 5th speed drive gear 170. The 1st speed gear train G1 is composed of a 1st speed drive gear 172 provided as one body with the second main shaft 106, and a 1st speed driven gear 173 relatively rotatably borne on the counter shaft 107 and meshed with the 1st speed drive gear 172.

The 3rd speed drive gear 168 is provided as one body with a third shifter 174, which is relatively non-rotatably and axially movably borne on the second main shaft 106. The third shifter 174 can be switchedly engaged with and disengaged from the 5th speed drive gear. A fourth shifter 175 capable of switching between a state of being engaged with the 3rd speed driven gear 169, a state of being engaged with the 1st speed driven gear 173, and a neutral state of being engaged with neither the 3rd speed driven gear 169 nor the 1st speed driven gear 173, is relatively non-rotatably and axially movably borne on the counter shaft 107 between the 3rd speed driven gear 169 and the 1st speed driven gear 173. The fourth shifter 175 is integrally provided with the 5th speed driven gear 171.

When the fourth shifter 175 is engaged with the 1st speed driven gear 173 in the condition where the third shifter 174 is not engaged with the 5th speed drive gear 170, the 1st speed gear train G1 is established. When the fourth shifter 175 is engaged with the 3rd speed driven gear 169 in the condition where the third shifter 174 is not engaged with the 5th speed drive gear 170, the 3rd speed gear train G3 is established. When the fourth shifter 175 is put into the neutral state and the third shifter 174 is engaged with the 5th speed drive gear 170, the 5th speed gear train G5 is established.

The first to fourth shifters 166, 167, 174, 175 are rotatably held by first to fourth shift forks 176, 177, 178, 179. When the shift forks 176 to 179 are driven in the axial direction of both the main shafts 105, 106 and the counter shaft 107, the first to fourth shifters 166, 167, 174, 175 are operated in the axial direction.

Figure 12:
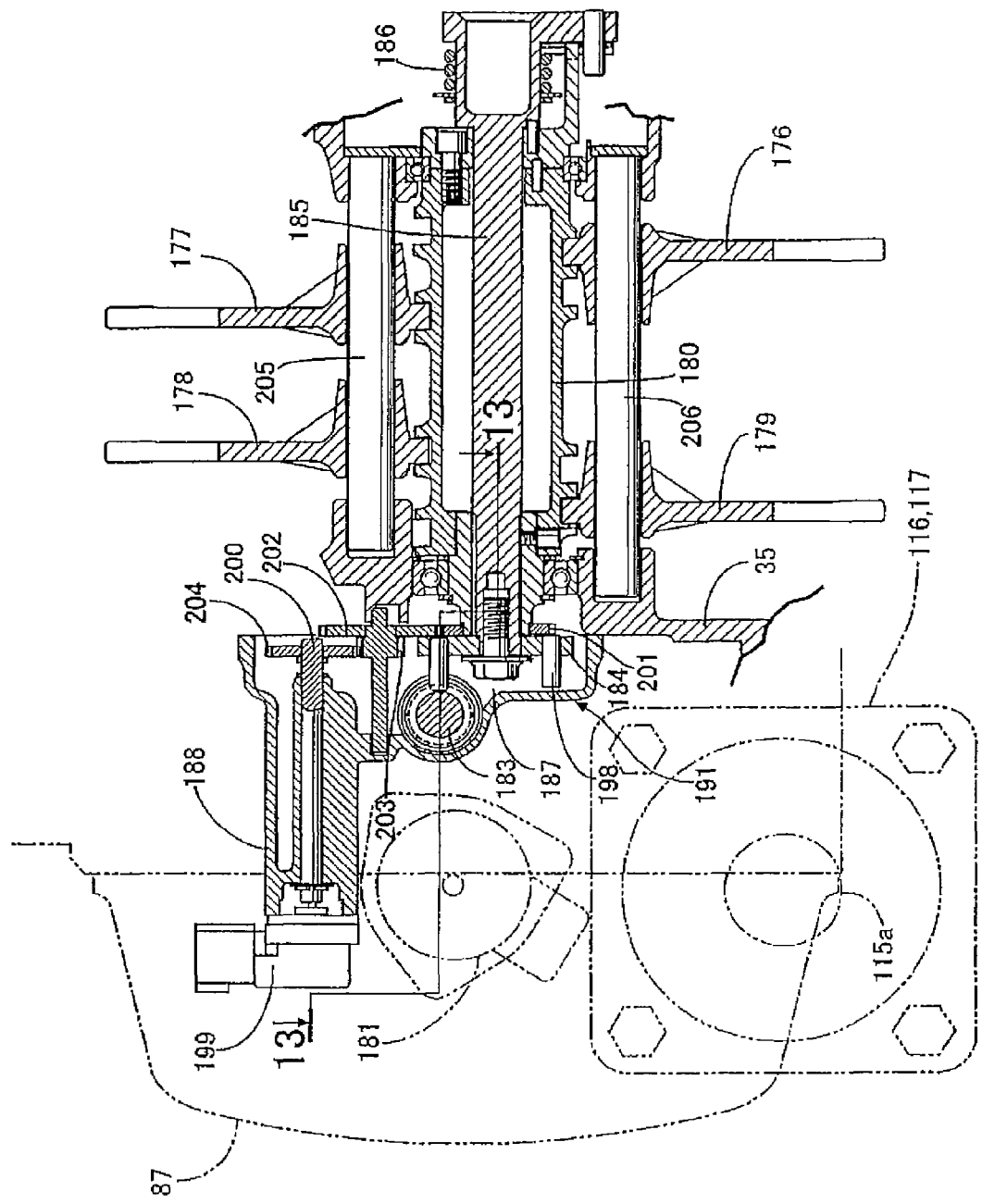
FIG. 12 is an enlarged sectional view taken along line 12-12 of FIG. 3.

In FIG. 12, a shift drum 180 constituting a part of the gear speed change mechanism 103 is rotatably borne on the crankcase 35 while having an axis parallel to the axis of the crankshaft 36, and the first to fourth shift forks 176 to 179 are engaged with the outer periphery of the shift drum 180. In addition, the shift forks 176 to 179 are slidably borne on shift fork shafts 205, 206 supported on the crankshaft 35 while having axes parallel to the shift drum 180. According to the turning of the shift drum 180, the shift forks 176 to 179 are slid on the shift fork shafts 205, 206.

With the shift drum 180 turned, the gear speed change mechanism 103 performs a speed change operation. A speed change controller 191 for controlling the speed change operation of the gear speed change mechanism 103 by changing the turning position of the shift drum 180 is mounted to the engine body 33 on the opposite side of the clutch device 102 with respect to the vehicle body center line CB, as shown in FIG. 2, in a direction along the axis of the crankshaft 36. In this embodiment, the speed change controller 191 is attached to a left side surface of the crankcase 35 in the condition where the engine body 33 is mounted on the body frame F.

Figure 13:
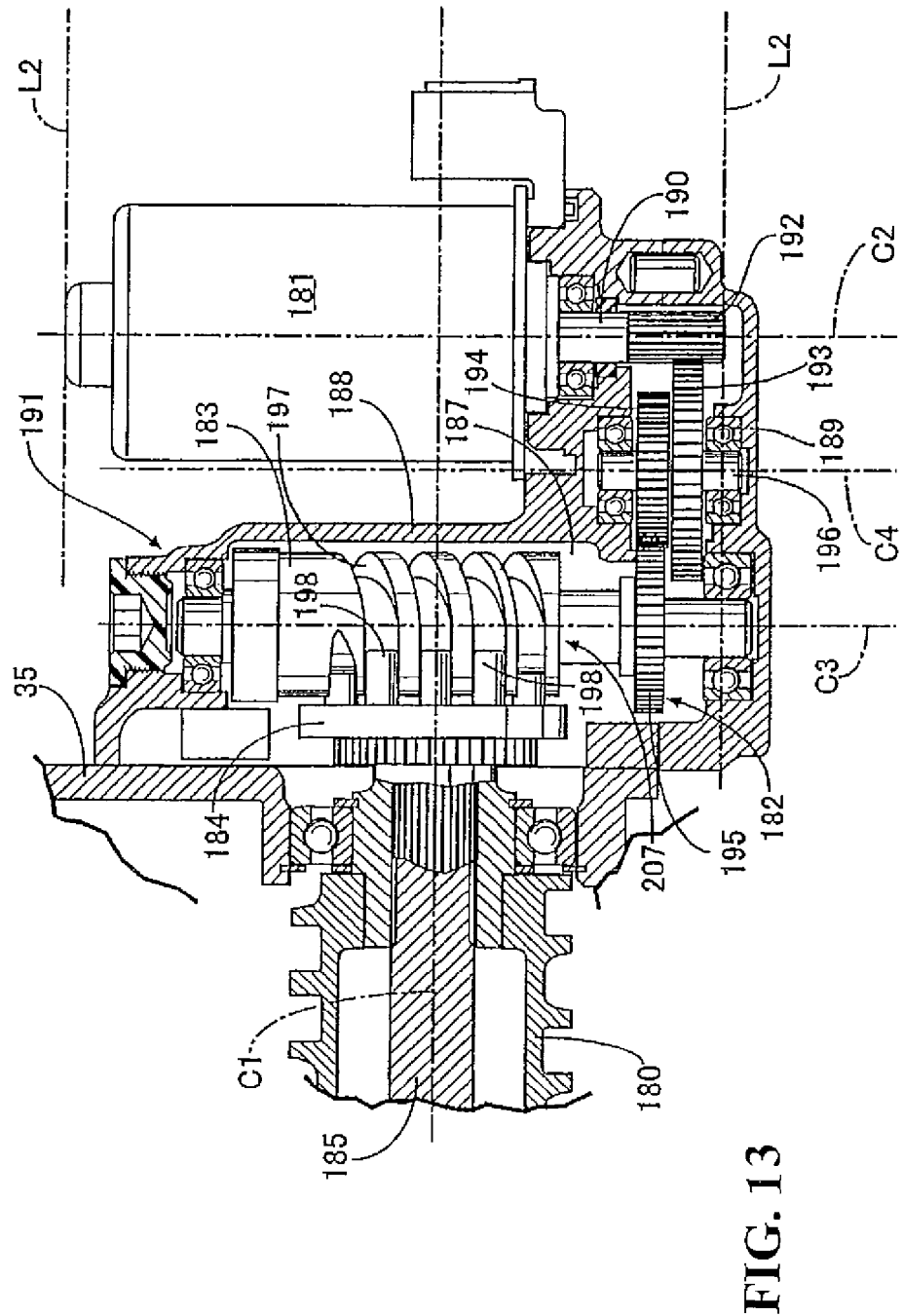
FIG. 13 is an enlarged sectional view taken along line 13-13 of FIG. 12.
Figure 14:
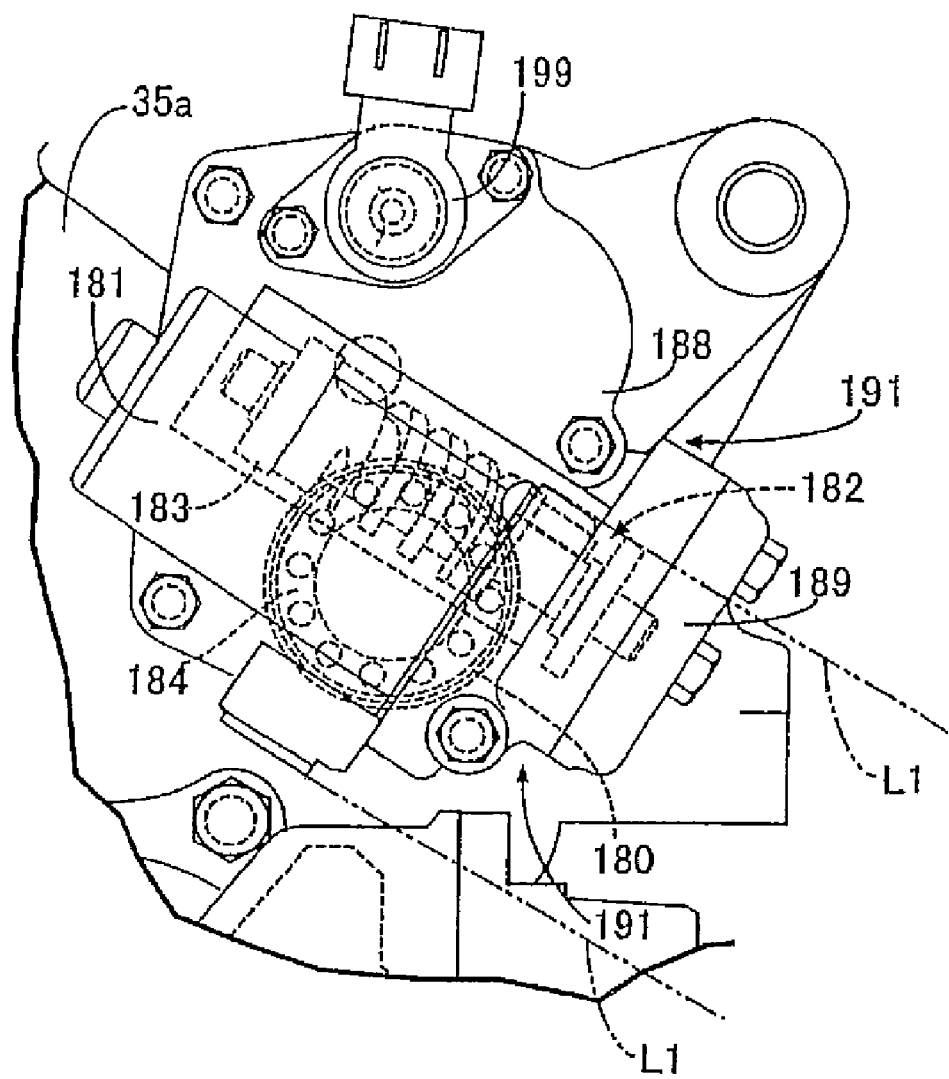
FIG. 14 is an enlarged view of an essential part of FIG. 3.

Referring to FIGS. 13 and 14 also, the speed change controller 191 includes an electric motor 181 for producing rotational power and a power transmission device 207 for transmitting the rotational power of the electric motor 181 to the shift drum 180. At least a part of the power transmission device 207 and the electric motor 181 are disposed on a lateral side of the crankcase 35 on the side of one end in the axial direction of the shift drum 180.

The power transmission device 207 includes a gear reduction mechanism 182 for transmitting the rotational power of the electric motor 181 so as to reduce the output rotating speed of the electric motor 181; a barrel cam 183 connected in conjunction to the gear reduction mechanism 182 so as to be rotated by the power transmitted from the gear reduction mechanism 182 and to convert the rotating motion into a turning motion of the shift drum 180; a circular disk-shaped power-transmitting rotary member 184 turned about the same axis of the shift drum 180 according to the rotation of the barrel cam 183; a power transmission shaft 185 relatively non-rotatably connected to the power-transmitting rotary member 184 and coaxially penetrating the shift drum 180 so as to permit relative turning of the shift drum 180; and a lost motion spring 186 provided between the power transmission shaft 185 and the shift drum 180. The gear reduction mechanism 182, the barrel cam 183 and the power-transmitting rotary member 184, of the power transmission device 207, are disposed on the left side of the crankcase 35.

A case member 188 for defining, between itself and the crankcase 35, an operating chamber 187 for containing the gear reduction mechanism 182, the barrel cam 183 and the power-transmitting rotary member 184 is fastened to a left side surface of the crankcase 35. A lid member 189 is attached to the case member 188 so as to close an open end of the case member 188. The electric motor 181 having its axis of rotation C2 disposed in a plane orthogonal to the axis of turning C1 of the shift drum 180 is attached to the case member 188 so that its motor shaft 190 projects into the operating chamber 187.

The barrel cam 183 is provided with a helical cam groove 197 in the outer periphery thereof. The axis of rotation C3 of the barrel cam 183 is disposed in a plane orthogonal to the axis of turning C1 of the shift drum 180, in the same manner as the electric motor 181 and the gear reduction mechanism 182, and is disposed in parallel to the axis of rotation C2 of the electric motor 181.

The gear reduction mechanism 182 includes a drive gear 192 provided on the motor shaft 190 of the electric motor 181; a first intermediate gear 193 meshed with the drive gear 192; a second intermediate gear 194 rotated together with the first internal gear 193; and a driven gear 195 provided on the barrel cam 183 and meshed with the second intermediate gear 194. The axis of rotation of the gear reduction mechanism 182, i.e., the axes of rotation of the drive gear 192, the first intermediate gear 193, the second intermediate gear 194 and the driven gear 195 are disposed in planes orthogonal to the axis of rotation C1 of the shift drum 180, like in the case of the electric motor 181. More specifically, the axis of rotation of the drive gear 192 is coaxial with the electric motor 181, the axis of rotation of the driven gear 195 is coaxial with the barrel cam 183, and the axis of rotation C4 of the first intermediate gear 193 and the second intermediate gear 194 is disposed in a plane orthogonal to the axis of rotation C1 of the shift drum 180, like in the cases of the electric motor 181 and the barrel cam 183.

The first and second intermediate gears 193, 194 are provided on a rotary shaft 196 rotatably borne at both end parts thereof on the case member 188 and the lid member 189, and both end parts of the barrel cam 183 are rotatably borne on the case member 188 and the lid member 189.

On the other hand, the power-transmitting rotary member 184 is disposed oppositely to the outer periphery of the barrel cam 183 so as to be rotatable about the same axis as the shift drum 180. The power-transmitting rotary member 184 is provided, at regular intervals in the circumferential direction thereof, with a plurality of engaging pins 198, 198 which can be selectively engaged with the cam groove 197. When the plurality of engaging pins 198, 198 are sequentially engaged with the cam groove 197 and fed, according to the rotation of the barrel cam 183, the rotational power about the same axis as the shift drum 180 is transmitted to the power-transmitting rotary member 184.

One end part of the power transmission shaft 185 coaxially and relatively rotatably penetrating the shift drum 180 is coaxially and relatively non-rotatably connected to the power-transmitting rotary member 184. The lost motion spring 186 is provided between the other end part of the power transmission shaft 185 and the other end part of the shift drum 180, so that the turning force arising from the turning of the power transmission shaft 185 is transmitted to the shift drum 180 through the lost motion spring 186.

In order to detect the turning position of the shift drum 180, a shift sensor 199 is attached to the case member 188, and a detection shaft 200 of the shift sensor 199 is rotatably borne on the case member 188.

A third intermediate gear 202 is meshed with a drive gear 201 rotated together with the shift drum 180, and a driven gear 204 provided on the detection shaft 200 is meshed with a fourth intermediate gear 203 rotated together with the third intermediate gear 202.

Moreover, as clearly shown in FIG. 14, the electric motor 181 and the shift drum 180 are disposed so as to at least overlap with each other when viewed in the axial direction of the shift drum 180. In addition, the electric motor 181 and the barrel cam 183 are so disposed as to at least partly overlap with each other when viewed in the axial direction of the shift drum 180. Further, the electric motor 181, the barrel cam 183 and the shift drum 180 are disposed so as to at least partly overlap one another when viewed in the axial direction of the shift drum 180.

In addition, the maximum width of the electric motor 181 in the direction of the axis of rotation of the electric motor 181 is the distance between a pair of straight lines L1, L1 represented by chain lines in FIG. 14, and the barrel cam 183 is present between both the straight lines L1, L1 as viewed in the axial direction of the shift drum 180. The maximum width of the electric motor 181 in the direction along the axis of the electric motor 181 is the distance between straight lines L2, L2 represented by chain lines in FIG. 13, and, when viewed along the axial line of the shift drum 180, at least a part of the barrel cam 183 is included within the maximum width of the electric motor 181 in the direction along the axis of the electric motor 181.

As illustrated in FIG. 3, a water pump 208 is attached to a left side surface of the crankcase 35 on the lower side of the generator cover 87. First and second oil pumps 209 and 210 and a scavenging pump 211 are contained in the crankcase 35 coaxially with the water pump 208. The first and second oil pumps 209 and 210 and the scavenging pump 211 are rotated together with the water pump 208. The rotational power from the driven gear 129 of the primary reduction gears 101 is transmitted to the water pump 208, the first and second oil pumps 209, 210 and the scavenging pump 211 through an endless chain 212. As shown in FIGS. 10 and 11, a drive sprocket 213 relatively non-rotatably engaged with the driven gear 129 is rotatably borne on the first main shaft 105, and the chain 212 is wrapped around a driven sprocket 214, which is connected in common to the water pump 208, the first and second oil pump 209, 210 and the scavenging pump 211, and around the drive sprocket 213.

Figure 15:
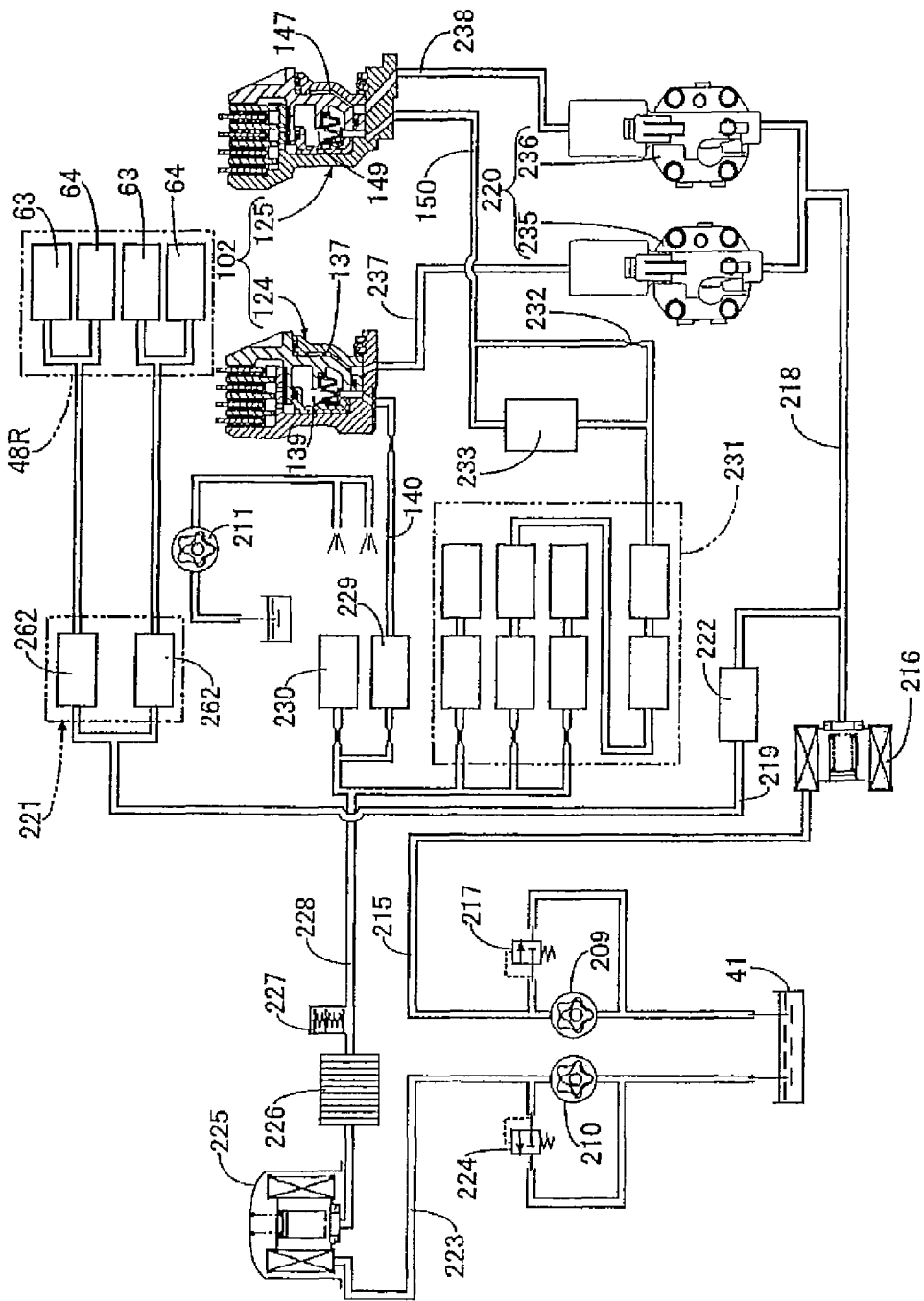
FIG. 15 is a block diagram showing the configuration of a hydraulic system.

In FIG. 15, the first oil pump 209 discharges an oil pressure for switching the connected/disconnected state of the first and second clutches 124, 125 in the clutch device 102 and for performing change-over operations of the suction-side valve operation mode change mechanism 63 and the exhaust-side valve operation mode change mechanism 64 in the rear bank side valve-operating device 48R. The oil sucked up from the oil pan 41 and discharged from the first oil pump 209 is connected to a first oil filter 216 through an oil passage 215, and a relief valve 217 is connected to the oil passage 215. In addition, the oil cleaned by the first oil filter 216 flows dividedly through bifurcated first and second branch oil passages 218, 219. The first branch oil passage 218 is connected to a clutch controller 220 for switching the connected/disconnected state of the clutch device 102. The second branch oil passage 219 is connected to a valve-operating oil pressure controller 221 for performing change-over operations of the suction-side valve operation mode change mechanism 63 and the exhaust-side valve operation mode change mechanism 64 in the rear bank side valve-operating device 48R, and a pressure reducing valve 222 is intermediately provided in the second branch oil passage 219.

In addition, the second oil pump 210 is for supplying a lubricating oil to lubricated parts of the engine E. The oil sucked up from the oil pan 41 and discharged from the second oil pump 210 is connected to a second oil filter 225 through an oil passage 223, and a relief valve 224 is connected to an intermediate part of the oil passage 223. The oil clarified by the first oil filter 225 is led into an oil passage 228 in which an oil cooler 226 is intermediately provided, and a pressure sensor 227 is connected to the oil passage 228.

The oil from the oil passage 228 is supplied to lubricated parts 229 in the periphery of the first and second main shafts 105, 106 in the gear speed change mechanism 103, to lubricated parts 230 in the periphery of the counter shaft 107 in the gear speed change mechanism 103, and to a plurality of lubricated parts 231 in the engine body 33. Moreover, oil from the lubricated parts 229 in the periphery of the first and second main shafts 105, 106 is led into a first oil passage 140 communicating with the canceller chamber 139 in the first clutch 124. In addition, oil from the lubricated parts 231 is supplied through a restrictor 232 into a second oil passage 150 communicating with the canceller chamber 149 in the second clutch 125. A solenoid shut-off valve 233 for supplying the oil speedily into the canceller chamber 149 is connected in parallel to the restrictor 232.

Referring to FIG. 4, the clutch controller 220 is composed of a first solenoid control valve 235 for switching the action/release of an oil pressure on/from the first oil pressure chamber 137 in the first clutch 124, and a second solenoid control valve 236 for switching the action/release of an oil pressure on/from the second oil pressure chamber 147 in the second clutch 125. The clutch controller 220 is disposed on the right side of the cylinder block 38F, and is attached to an outside surface of the clutch cover 92. Moreover, the first and second solenoid control valves 235, 236 constituting the clutch controller 220 are disposed at positions different in the front-rear direction and in the vertical direction. More specifically, of the first and second solenoid control valves 235, 236, the second solenoid control valve 236 is disposed above the first solenoid control valve 235.

The clutch cover 92 is provided with an oil passage 237 for connection between the first solenoid control valve 235 and the first oil passage 154 communicating with the first oil pressure chamber 137 in the first clutch 124, and with an oil passage 238 for connection between the second solenoid control valve 236 and the second oil passage 157 communicating with the second oil pressure chamber 147 in the second clutch 125.

The valve-operating oil pressure controller 221 is composed of a pair of solenoid control valve 262, 262 corresponding individually to the two cylinders in the rear bank BR, and, in the direction along the axis CC of the crankshaft 36, it is attached to the engine body 33 on the opposite side of the clutch device 102 with respect to the vehicle body center line CB, as shown in FIG. 2. In this embodiment, the valve-operating oil pressure controller 221 is attached to a left side surface of a rear cylinder head 39R in the rear bank BR, and the second branch oil passage 219 is provided in the crankcase 35 and the rear cylinder block 38R and the rear cylinder head 39R.

The solenoid control valve 262 on one side is for controlling the oil pressures in the intake-side and exhaust-side valve operation mode change mechanisms 63, 64 in one of the two cylinders, and the solenoid control valve 262 on the other side is for controlling the oil pressures in the intake-side and exhaust-side valve operation mode change mechanisms 63, 64 in the other of the two cylinders.

The operation of this embodiment will be described below. The speed change controller 191 for turningly driving the shift drum 180 constituting a part of the gear speed change mechanism 103 and rotatably borne on the crankcase 35 for causing the gear speed change mechanism to perform a speed change operation includes the electric motor 181 for producing rotational power. The power transmission device 207 transmits the rotational power of the electric motor 181 to the shift drum 180, wherein at least a part of the power transmission device 207 and the electric motor 181 are disposed on a lateral side (in this embodiment, the left side) of the crankcase 35 on the side of one end in the axial direction of the shift drum 180. In this case, the electric motor 181 and the shift drum 180 are disposed as to at least partly overlap with each other when viewed in the axial direction of the shift drum 180. Therefore, it is possible to reduce the area occupied by the shift drum 180 and the electric motor 181 on a lateral side of the crankcase 35, and to further enhance the degree of freedom in laying out other component parts. Also, by laying out the electric motor 181 and the shift drum 180 close to each other, it is possible to reduce the power transmission device 207 in size and to contrive a reduction in weight.

The power transmission device 207 includes the gear reduction mechanism 182 for transmitting the rotational power of the electric motor 181 while reducing the output rotating speed of the electric motor 181. The barrel cam 183 is connected in conjunction to the gear reduction mechanism 182 so as to be rotated by the power transmitted from the gear reduction mechanism 182 and to convert the rotating motion into a turning motion of the shift drum 180. The barrel cam 183 and the electric motor 181 disposed on a lateral side of the crankcase 35 on the side of one end in the axial direction of the shift drum 180 are disposed so as to at least partly overlap with each other when viewed along the axial direction of the shift drum 180. Therefore, it is possible to reduce the area occupied by the electric motor 181 and the barrel cam 183 on the left side of the crankcase 35, and to enhance the degree of freedom in laying out other component parts.

In addition, since the barrel cam 183 is disposed so as to at least partly overlap with the shift drum 180 when viewed along the axial direction of the shift drum 180, it is possible to lay out the electric motor 181 and the barrel cam 183 close to each other on the side of the shift drum 180, to reduce the area occupied by the electric motor 181 and the barrel cam 183 on the left side of the crankcase 35, to enhance the degree of freedom in laying out other component parts, to reduce the gear reduction mechanism 182 and the barrel cam 183 in size, and to contrive a reduction in weight.

Since the axes of rotation of the electric motor 181, the gear reduction mechanism 182 and the barrel cam 183 are each disposed in a plane orthogonal to the axis of the shift drum 180, the protrusion of the electric motor 181, the gear reduction mechanism 182 and the barrel cam 183 from a side surface of the crankcase 35 can be suppressed. Especially, the protrusion amount of the electric motor 181, which protrudes the most from the side surface of the crankcase 35, can be suppressed, thereby contributing to a reduction in the size of the engine E.

In addition, since the axis of rotation of the barrel cam 183 is parallel to the axis of rotation of the electric motor 181, the part of overlap of the electric motor 181 and the barrel cam 183 as viewed along the axial direction of the shift drum 180 can be set to be large, and the area occupied by the electric motor 181 and the barrel cam 183 on a lateral side of the crankcase 35 can be further reduced.

Since the barrel cam 183 is disposed so that at least a part thereof is included within the maximum width of the electric motor 181 in the axial direction of the electric motor 181 when viewed along the axial direction of the shift drum 180, the area occupied by the electric motor 181 and the barrel cam 183 on a lateral side of the crankcase 35 can be further reduced.

Further, since the motion conversion means which is rotated by the power transmitted from the gear reduction mechanism 182 and which converts the rotating motion into a turning motion of the shift drum 180 is the barrel cam 183 provided with the helical cam groove 197 in its outer periphery, it is possible to simplify the configuration of the motion conversion means and to further reduce the size of the motion conversion means.

The valve-operating device 48R of the rear bank BR is additionally provided with the intake-side and exhaust-side valve operation mode change mechanisms 63, 64 capable of changing the operation modes of the intake valves 44 and the exhaust valves 45. The clutch device 102 for switching the making/breaking of power transmission between the crankshaft 36 and the gear speed change mechanism 103 provided in the course of the power transmission path for transmitting the rotational power of the crankshaft 36 to the rear wheel WR is disposed on a lateral side of the crankcase 35 on the side of one end of the crankshaft 36. A valve operation controller 221 for controlling the operations of the intake-side and exhaust-side valve operation mode change mechanisms 63, 64 and the speed change controller 191 for controlling the speed change operation of the gear speed change mechanism 103 are attached to the engine body 33. In this case, the valve operation controller 221 and the speed change controller 191 are attached to the engine body 33 on the opposite side of the clutch device 102 with respect to the vehicle center line CB, in the direction along the axis of the crankshaft 36. Thus, in the direction along the axis CC of the crankshaft 36, the valve operation controller 221 and the speed change controller 191 are attached to the engine body 33 on the opposite side of the clutch device 102, which is a heavyweight body. Therefore, the center of gravity of the power unit P can be prevented from being largely deviated to the side where the clutch device 102 is disposed. Consequently, the need to concentratedly dispose the vehicle component parts on the side opposite to the side of the clutch device 102 for the purpose of obtaining good balance of the center of gravity of the vehicle as a whole, and, accordingly, the degree of freedom in laying out the vehicle component parts can be enhanced.

In addition, since the valve operation controller 221 and the speed change controller 191 are attached to the left side surface of the engine body 33, maintenance of the valve operation controller 221 and the speed change controller 191 is facilitated. On the other hand, in the case where the valve operation controller 221 and the speed change controller 191 are attached to back surfaces of the cylinder blocks 39F and 39R in the engine body 33 or to an upper surface of the crankcase 35, maintenance cannot be said to be easy, since the exhaust system and/or the intake system serves as an obstacle.

The clutch cover 92 defining between itself and the crankcase 35 the clutch chamber 91 for accommodating the clutch device 102 is connected to the crankcase 35. The clutch controller 220 for controlling the connection/disconnection operations of the clutch device 102 is attached to the clutch cover 92. Therefore, the clutch deice 102, the clutch cover 92 and the clutch controller 220 are laid out on one end side of the crankshaft 36, so that the power unit P is increased in weight at the part on one end side of the crankshaft 36. However, since the valve operation controller 221 and the speed change controller 191 are attached to the engine body 33 on the opposite side of the clutch device 102 in the direction along the axis of the crankshaft 36, the center of gravity of the power unit P can be prevented from being largely deviated toward the side where the clutch device 102, the clutch cover 92 and the clutch controller 220 are disposed. Consequently, the clutch device 102 and the clutch controller 220 can be disposed close to each other so as to be compact as a whole.

In addition, the generator 84 driven by the power transmitted from the crankshaft 36 is disposed on the opposite side of the clutch device 102 in the axial direction of the crankshaft 36, and a power generation voltage control driver 286 for controlling the power generation voltage of the generator 84 is attached to the generator cover 87 which is connected to the crankcase 35 so as to define between itself and the crankcase 35 the generator containing chamber 88 for accommodating the generator 84. This, in cooperation with the valve operation controller 221 and the speed change controller 191, makes it possible to prevent the center of gravity of the power unit P from being largely deviated toward the side where the clutch device 102 is disposed.

Further, the gear speed change mechanism 103 has the first and second main shafts 105 and 106 parallel to each other, and the single counter shaft 107 parallel to the main shafts 105, 106. In addition, the clutch device 102 is configured to be of the twin-clutch type, including the first clutch 124 interposed between the crankshaft 36 and the first main shaft 105, and the second clutch 125 interposed between the crankshaft 36 and the second main shaft 106. Therefore, the weight of the clutch device 102 is increased. However, since the valve operation controller 221 and the speed change controller 191 are mounted to the engine body 33 on the opposite side of the clutch device 102 in the direction along the axis of the crankshaft 36, the center of gravity of the power unit P can be prevented from being largely deviated toward the side of the clutch device 102.

While one embodiment of the present invention has been described above, the invention is not limited to the above-described embodiment, and various design modifications are possible within the scope of the invention as set forth in the claims.

For example, while the case of applying the present invention to a power unit for a motorcycle has been described in the above embodiment, the present invention is applicable not only to power units for motorcycles but also to power units for small type vehicles such as three-wheel vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit for a small type vehicle comprising:
an engine having a valve-operating device provided additionally with valve operation mode change mechanisms capable of changing operation modes of engine valves;
a crankshaft having an axis set along the vehicle width direction, said crankshaft rotatably borne on a crankcase of said engine;
a speed change mechanism provided in the course of a power transmission path for transmitting rotational power of said crankshaft to a drive wheel, said speed change mechanism being contained in said crankcase;
a clutch device for switching the making/breaking of power transmission between said crankshaft and said speed change mechanism, said clutch device disposed on a lateral side of said crankcase on the side of one end of said crankshaft;
a valve operation controller for controlling the operations of said valve operation mode change mechanisms; and
a speed change controller for controlling a speed change operation of said speed change mechanism, said valve operation controller and said speed change controller being directly attached to an engine body inclusive of said crankcase, wherein said valve operation controller and said speed change controller are attached to said engine body on the opposite side of said clutch device with respect to a vehicle body center line in a direction along the axis of said crankshaft,
wherein said valve operation controller and said speed change controller are attached to a side surface, along said vehicle body center line, of said engine body,
wherein a shift drum is rotatably borne on said crankcase parallel to the axis of said crankshaft,
wherein said speed change controller includes an electric motor for producing rotation power, and a power transmission device for transmitting the rotation power of said electric motor to said shift drum, and wherein an axis of rotation of said electric motor is orthogonal to an axis of turning of the shift drum.

2. The power unit for a small type vehicle as set forth in claim 1, wherein a clutch cover defining between itself and said crankcase a clutch chamber for containing said clutch device is connected to said crankcase and a clutch controller for controlling connection/disconnection operations of said clutch device is attached to said clutch cover.

3. The power unit for a small type vehicle as set forth in claim 2, wherein a generator driven by power transmitted from said crankshaft is disposed on the opposite side of said clutch device in the axial direction of said crankshaft and a power generation voltage control driver for controlling a power generation voltage of said generator is attached to the inside of a generator cover connected to said crankcase so as to define between itself and said crankcase a generator containing chamber for containing said generator.

4. The power unit for a small type vehicle as set forth in claim 2, wherein said speed change mechanism includes first and second input shafts parallel to each other, and a single output shaft parallel to said input shafts and said clutch device is configured to be of a twin-clutch type, including a first clutch interposed between said crankshaft and said first input shaft and a second clutch interposed between said crankshaft and said second input shaft.

5. The power unit for a small type vehicle as set forth in claim 1, wherein a generator driven by power transmitted from said crankshaft is disposed on the opposite side of said clutch device in the axial direction of said crankshaft and a power generation voltage control driver for controlling a power generation voltage of said generator is attached to the inside of a generator cover connected to said crankcase so as to define between itself and said crankcase a generator containing chamber for containing said generator.

6. The power unit for a small type vehicle as set forth in claim 1, wherein said speed change mechanism includes first and second input shafts parallel to each other, and a single output shaft parallel to said input shafts and said clutch device is configured to be of a twin-clutch type, including a first clutch interposed between said crankshaft and said first input shaft and a second clutch interposed between said crankshaft and said second input shaft.

7. A controller for use with a power unit for a vehicle comprising:
a speed change mechanism operatively connected to a power transmission;
a clutch device for selectively connecting and disconnecting the power transmission between a crankshaft and the speed change mechanism, said clutch device disposed on a lateral side of a crankcase on the side of one end of said crankshaft;

a valve operation controller for controlling operations of valve operation mode change mechanisms; and a speed change controller for controlling a speed change operation of said speed change mechanism, said valve operation controller and said speed change controller being directly attached to an engine body inclusive of said crankcase, wherein said valve operation controller and said speed change controller are attached to said engine body on the opposite side of said clutch device with respect to a vehicle body center line in a direction along the axis of said crankshaft, wherein said valve operation controller and said speed change controller are attached to a side surface, along said vehicle body center line, of said engine body, wherein a shift drum is rotatably borne on said crankcase parallel to the axis of said crankshaft, Wherein said speed change controller includes an electric motor for producing rotation power, and a power transmission device for transmitting the rotation power of said electric motor to said shift drum, and wherein an axis of rotation of said electric motor is orthogonal to an axis of turning of the shift drum.

8. The controller for use with a power unit for a vehicle as set forth in claim 7, wherein a clutch cover defining between itself and said crankcase a clutch chamber for containing said clutch device is connected to said crankcase and a clutch controller for controlling connection/disconnection operations of said clutch device is attached to said clutch cover.

9. The controller for use with a power unit for a vehicle as set forth in claim 8, wherein a generator driven by power transmitted from said crankshaft is disposed on the opposite side of said clutch device in the axial direction of said crankshaft and a power generation voltage control driver for controlling a power generation voltage of said generator is attached to the inside of a generator cover connected to said crankcase so as to define between itself and said crankcase a generator containing chamber for containing said generator.

10. The controller for use with a power unit for a vehicle as set forth in claim 7, wherein a generator driven by power transmitted from said crankshaft is disposed on the opposite side of said clutch device in the axial direction of said crankshaft and a power generation voltage control driver for controlling a power generation voltage of said generator is attached to the inside of a generator cover connected to said crankcase so as to define between itself and said crankcase a generator containing chamber for containing said generator.

* * * * *